(12) United States Patent
Brown et al.

(10) Patent No.: US 12,483,418 B2
(45) Date of Patent: *Nov. 25, 2025

(54) SYSTEM AND METHOD FOR PRESENTING ASSIGNED CONTENT TO A USER BASED ON USER'S ASSOCIATION WITH A RECOGNIZED ARTICLE AND RIGHTS TO ACCESS

(71) Applicant: Sneakertopia Inc., Malibu, CA (US)

(72) Inventors: Stephen J. Brown, Malibu, CA (US); Stephen C. Harris, Los Angeles, CA (US)

(73) Assignee: Sneakertopia Inc., Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,296

(22) Filed: Jun. 28, 2024

(65) Prior Publication Data
US 2025/0055699 A1 Feb. 13, 2025

Related U.S. Application Data

(63) Continuation of application No. 18/123,585, filed on Mar. 20, 2023, now Pat. No. 12,058,272, which is a
(Continued)

(51) Int. Cl.
*G06V 20/20* (2022.01)
*G06F 18/22* (2023.01)
(Continued)

(52) U.S. Cl.
CPC ........... *H04L 9/3239* (2013.01); *G06F 18/22* (2023.01); *G06V 10/225* (2022.01);
(Continued)

(58) Field of Classification Search
CPC ...... G06V 20/20; G06V 40/10; G06V 40/172; G06V 2201/10; G06V 10/225;
(Continued)

(56) References Cited

U.S. PATENT DOCUMENTS 8,224,293 B1   7/2012  Knapp et al.
8,606,645 B1   12/2013 Applefeld
(Continued)

OTHER PUBLICATIONS

Gaebel, Ethan D., "Looks Good to Me: Authentication for Augmented Reality", Masters of Science Thesis, Computer Science & Applications, Virginia Polytechnic Institute and State University, May 2, 2016, 91 pgs., Falls Church, VA, U.S.A.
(Continued)

*Primary Examiner* — Jitesh Patel
(74) *Attorney, Agent, or Firm* — Asif Ghias

(57) ABSTRACT

A system and method for presenting assigned content to a user on a user's device after validating an association of the user with a recognized article based on a valid spatial relationship between the user and the recognized article and also after verifying rights to access the assigned content by the user. The user device equipped with at least one camera used to determine if the article is properly presented. The device captures images and the system has the ability to determine from the images and any additional spatial information the orientation and/or position parameters of the article to confirm whether the valid spatial relationship exists between the recognized article and the user device. The assigned content presented to the user can be contextual and can range from items such as images, music, videos, games, virtual content, augmented content, coupons (virtual or physical), promotions, special offers and the like.

29 Claims, 19 Drawing Sheets

Related U.S. Application Data continuation of application No. 17/227,116, filed on Apr. 9, 2021, now Pat. No. 11,626,994, which is a continuation-in-part of application No. 16/919,956, filed on Jul. 2, 2020, now abandoned.

(60) Provisional application No. 62/982,526, filed on Feb. 27, 2020.

(51) Int. Cl.
*G06V 10/22* (2022.01)
*G06V 10/24* (2022.01)
*G06V 40/10* (2022.01)
*G06V 40/16* (2022.01)
*H04L 9/32* (2006.01)
*H04L 9/40* (2022.01)

(52) U.S. Cl.
CPC ............ *G06V 10/242* (2022.01); *G06V 20/20* (2022.01); *G06V 40/10* (2022.01); *G06V 40/172* (2022.01); *H04L 9/3213* (2013.01); *H04L 63/10* (2013.01)

(58) Field of Classification Search
CPC ...... G06V 10/242; G06K 9/6201; G06T 7/73; G06T 11/00; G06T 2207/30196; G06T 2200/24; G06T 2207/30204; H04N 5/23222; H04N 5/247; H04N 5/232939
See application file for complete search history.

(56) References Cited

U.S. PATENT DOCUMENTS

| | | |
|---|---|---|
| 8,850,337 B2 | 9/2014 | Ooi et al. |
| 8,890,896 B1 | 11/2014 | Tseng |
| 9,240,075 B2 | 1/2016 | Mullins |
| 9,256,806 B2 | 2/2016 | Aller et al. |
| 9,269,011 B1 | 2/2016 | Sikka et al. |
| 9,280,852 B2 | 3/2016 | Adhikari et al. |
| 9,338,603 B2 | 5/2016 | Chao et al. |
| 9,338,622 B2 | 5/2016 | Bjontegard |
| 9,363,569 B1 | 6/2016 | vanHoff et al. |
| 9,449,343 B2 | 9/2016 | Mayerle et al. |
| 9,575,724 B1 | 2/2017 | Liberatori, Jr. |
| 9,910,501 B2 | 3/2018 | Chirakan et al. |
| 9,928,655 B1 * | 3/2018 | Alston ............... G06F 3/04815 |
| 9,996,979 B2 | 6/2018 | Xiong |
| 10,083,379 B2 | 9/2018 | Stoop et al. |
| 10,134,084 B1 | 11/2018 | Gabriele et al. |
| 10,142,496 B1 | 11/2018 | Rao et al. |
| 10,282,904 B1 | 5/2019 | Ramesh et al. |
| 10,380,546 B2 | 8/2019 | Chau |
| 10,412,210 B2 | 9/2019 | Bjontegard |
| 10,432,601 B2 | 10/2019 | Soon-Shiong |
| 10,477,602 B2 | 11/2019 | Fraccaroli |
| 10,540,575 B1 | 1/2020 | Brody |
| 10,540,776 B2 | 1/2020 | Tran et al. |
| 2015/0058229 A1 | 2/2015 | Wiacek et al. |
| 2015/0262208 A1 | 9/2015 | Bjontegard |
| 2016/0070439 A1 | 3/2016 | Bostick et al. |
| 2016/0180193 A1 | 6/2016 | Masters et al. |
| 2017/0091975 A1 | 3/2017 | Zises |
| 2017/0200046 A1 | 7/2017 | Bang et al. |
| 2017/0301001 A1 | 10/2017 | Wilkinson et al. |
| 2018/0033045 A1 | 2/2018 | Flynn |
| 2018/0088746 A1 | 3/2018 | Cheung et al. |
| 2018/0125170 A1 | 5/2018 | Hill et al. |
| 2018/0341811 A1 | 11/2018 | Bendale et al. |
| 2018/0357670 A1 | 12/2018 | DeLuca et al. |
| 2018/0365750 A1 * | 12/2018 | Di ....................... G06Q 30/0631 |
| 2018/0365760 A1 | 12/2018 | Faris et al. |
| 2019/0080344 A1 | 3/2019 | Faris et al. |
| 2019/0130285 A1 | 5/2019 | Snyder et al. |
| 2019/0201806 A1 | 7/2019 | Weston |
| 2019/0213619 A1 | 7/2019 | Andon et al. |
| 2019/0228448 A1 | 7/2019 | Bleicher et al. |
| 2019/0236605 A1 | 8/2019 | Mchale et al. |
| 2019/0297461 A1 | 9/2019 | Charlton et al. |
| 2019/0303892 A1 | 10/2019 | Yantis et al. |
| 2019/0325279 A1 * | 10/2019 | Wang ......................... G06T 7/13 |
| 2019/0371067 A1 | 12/2019 | Simari et al. |
| 2020/0004948 A1 | 1/2020 | Zhu |
| 2020/0007677 A1 | 1/2020 | Bjontegard |
| 2020/0184041 A1 | 6/2020 | Andon et al. |
| 2022/0031068 A1 | 2/2022 | Jang et al. |

OTHER PUBLICATIONS

Guzman de, Jaybie A. et al., "Security and Privacy Approaches in Mixed Reality: A Literature Survey", arXiv:1802.05797v2, Jun. 26, 2018, 40 pgs.

* cited by examiner

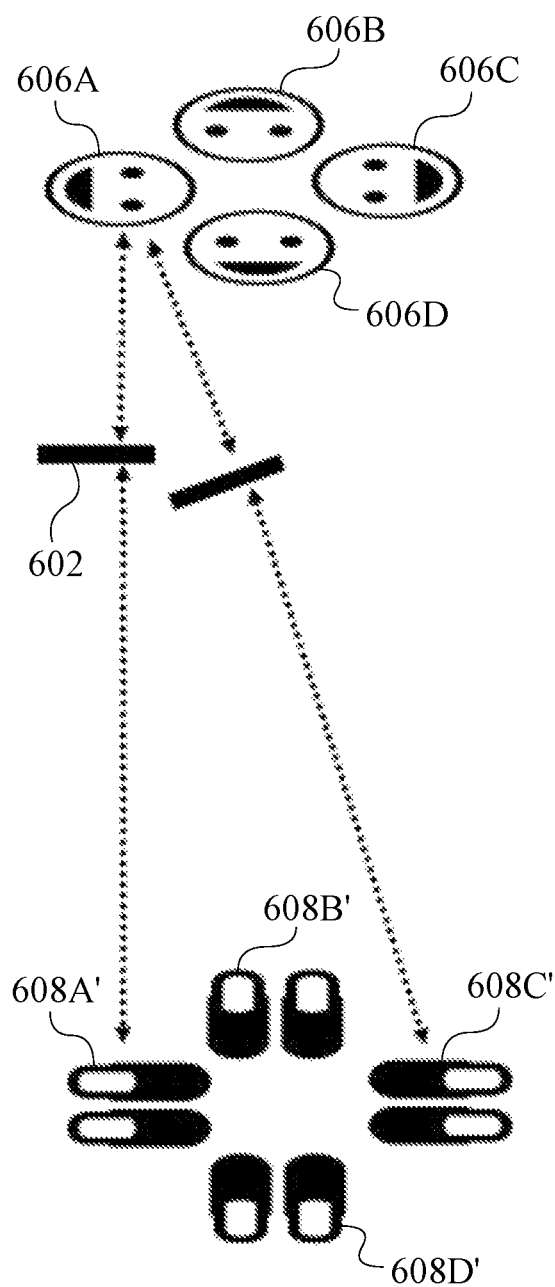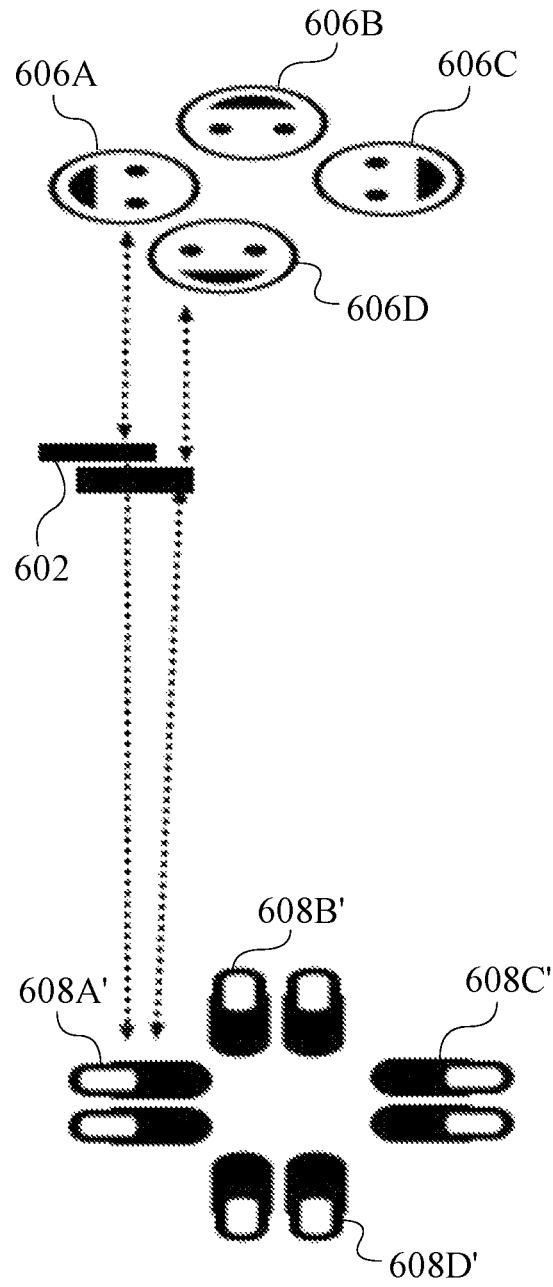
*Fig. 6C*  *Fig. 6D*

SYSTEM AND METHOD FOR PRESENTING ASSIGNED CONTENT TO A USER BASED ON USER'S ASSOCIATION WITH A RECOGNIZED ARTICLE AND RIGHTS TO ACCESS

RELATED APPLICATIONS

This application is a Continuation of now allowed U.S. patent application Ser. No. 18/123,585 filed on 2023 Mar. 20, which is a Continuation of U.S. patent application Ser. No. 17/227,116 filed on 2021 Apr. 9 and issued as U.S. Pat. No. 11,626,994 on 2023 Mar. 22, which is a Continuation-In-Part of abandoned U.S. patent application Ser. No. 16/919,956 filed on 2020 Jul. 2, which claims priority from U.S. Provisional Application No. 62/982,526 filed on 2020 Feb. 27. All the above-numbered patents and patent applications are herein incorporated by reference in their entireties for all purposes.

FIELD OF THE INVENTION

The present invention relates generally to granting access to content such as virtual or augmented reality experiences that overlay virtual elements or objects on top of unaltered reality when the user has properly presented an article and that article is also confirmed to be verifiably owned by, licensed to, or in possession of the user.

BACKGROUND OF THE INVENTION

The state of recommendation systems aiming to personalize user experience by assigning targeted content is very complex. These systems typically rely on many different types of user devices and contexts to infer user preferences and to match content based on these factors.

Given the ubiquity of manipulated user devices, including portable computers, pads, tablets and smart phones capable of delivering various types of content, the resources on-board these devices are being leveraged in many ways to accomplish the goal of user experience customization/personalization.

The advent of augmented reality (AR) capabilities on-board manipulated user devices has opened up still more avenues to present targeted content to a user. Additionally, augmented reality devices can display such personalized content in new and more immersive ways. These enhancements in presentation can add value to the experience of the user. For example, U.S. Pat. No. 8,606,645 to Applefeld teaches the use of a triggering feature in a retail product and a background image to present augmented reality and retail-related information to the user. Such triggering of content based on location is often referred to as location-based content delivery. The prior art also teaches to allow access to content based on contextual information. U.S. Pat. No. 9,338,622 as well as U.S. Published Application 2015/0262208 both to Bjontegard teach an augmented reality (AR) system that provides content based on context. The content includes recommendations, offers, coupons as well as other context-dependent information and offerings.

Some systems operate in virtual reality (VR). In that realm the user's gaze can be used to trigger the release of targeted content to a user. For example, U.S. Pat. No. 9,363,569 to van Hoff teaches to identify gaze while the user is viewing VR content. In addition, van Hoff teaches to use gaze-based interests in building social networks that are based on objects of interest to the users. A simpler approach is taught in U.S. Published Application 2018/0357670 to DeLuca et al. There, content such as products of interest are identified from a catalog and sent to the user.

A more extensive use of AR capabilities is taught in U.S. Published Application 2019/0228448 to Bleicher et al., which discloses an in store virtual shopping assistant. The approach leverages AR to provide an augmented in-store experience. It teaches deployment of a user device equipped with a camera to capture a part of a user's body and to a apply a user shopping profile to assist in shopping selection. The capture includes the length, breadth and depth of the body part.

These approaches are merely representative of the many ways in which AR and VR are being leveraged to provide targeted user content. However, none of these approaches presents a strategy for reliable validation and accessing of content by a user. Specifically, in the context of transactions involving real articles and content that may include virtual goods, there is no suitable system or method to keep track of the transactions and grant user access to the content in a convenient manner.

SUMMARY OF THE INVENTION

The objects and advantages of the invention are provided for by a method and a system for identifying an article presented by a user in an environment. The system and method establish a condition under which an assigned content is then displayed to the user. The condition is two-pronged in that the article has to be validly presented by the user and also the article has to be verifiably owned by or in possession of the user, whether owned, licensed, borrowed or rented.

The system relies on a manipulated user device that is equipped with at least one camera. The user will typically choose a very portable device, such as their smart phone, pad, tablet or still other easy to manipulate electronic device as the manipulated user device in the system. We note that many such portable devices have at least two cameras, a front facing camera and a back facing camera pointed toward the user. In fact, some smart phones may be provisioned with still more front, back and even side facing cameras and/or still other photodetectors or photosensors.

A pose estimation module, typically residing on-board the manipulated user device, is deployed to estimate the pose of the user device. Pose is a technical term used by those skilled in the art to cover both position and orientation. In other words, knowing the pose of the user device fully describes its physical location and orientation in the environment where the user finds himself or herself. Furthermore, changes in pose describe all the possible movements that the user device can experience by being either moved linearly and/or rotated about any arbitrary axis. In most manipulated user devices the pose estimation module will rely on the at least one camera and at least one camera image taken by the camera as well as data from auxiliary sensors. Suitable auxiliary sensors include inertial units (gyros and/or accelerometers), magnetic units, acoustic units and/or still other relative or absolute position and motion sensing units. In many instances the data from the camera image and from any auxiliary sensor(s) is fused to estimate the pose of the user device.

The system also has an image recognition module that may be on-board the manipulated user device or distributed between the user device and a remote server or facility. The image recognition module is in communication with the camera so that it can use one or more camera images to recognize therein the article presented by the user. More specifically, the image recognition module recognizes the article from a best match with one or more reference images of articles and provides an article pose estimate to at least one camera image that contains the article. Recognition of the article can involve attaching an article label to one or more images in which an image of the article is found. Once labelled through the best match the article is treated by the system as a recognized article.

Proper presentation of the article by the user may include attributes that include proper positioning in the field of view of the camera that is taking the image or images, proper lighting, proper line-of-sight (reduced occlusion) and/or any other attributes that ensure that the article can be processed by the system to become a recognized article.

Obtaining the article pose estimate can involve attaching an article pose tag to one or more images in which an image of the article is found. Such pose tag attached to the article or recognized article provides information related to the pose of the article in the camera image where it was recognized. The pose tag may include a small subset of pose information, e.g., just a general article orientation data, general article position data, any combination of orientation and position data or parameters all the way up to the full article pose (complete orientation and position).

The system is provided with a spatial computation module that is in communication with the image recognition module as well as with the pose estimation module. From the data obtained the spatial computation module estimates whether a valid spatial relationship exists between the recognized article and the user. More precisely, based on the pose of the manipulated device held by the user and the article pose estimate that provides some data about the article's pose the spatial computation module determines whether the user is properly presenting the recognized article. The value of such estimate of a valid spatial relationship is used to validate, e.g., by using a threshold or other statistical approach, that the recognized article is validly presented by the user.

In the simplest case the pose may simply include a subset of all the six parameters of position and orientation, for example just a proximity to the camera (position parameters).

The system also has an ownership or rights verification module that is in communication with the image recognition module. The rights verification module works with the recognized article as recognized by the image recognition module. Specifically, rights verification module looks up a token associated with the article that is recognized. The token is preferably stored on a blockchain. The token is used to determine whether the article is verifiably owned by or in possession of the user that has presented it, or that the user otherwise possesses the rights associated with the article.

At this point the system checks to establish that the two-pronged condition is satisfied. Namely, that the article is validly presented by the user and also that the rights to the article is verifiably owned by or in possession of the user or that the user verifiably possesses the rights to the assigned content associated with the article, which can be in the form of explicit ownership of the associated token or a license specified in the rules of a smart contract associated with the token. Upon establishment of the condition the manipulated user device releases or displays the assigned content. The assigned content can take on various forms such as a music item, a video item, a game item, a video game content, a virtual content, an augmented content, a coupon, a promotion and a special offer. When the manipulated user device is an augmented reality device the assigned content can include a virtual object that is displayed to the user.

In some embodiments of the invention the user device can display non-assigned content to the user prior to establishing the condition for releasing the assigned content. The non-assigned content can include general information about what the assigned content is about. Further, the non-assigned content may present hints or information about the manner in which the article should be presented to make sure it is duly recognized. For example, the information may include pointers about the position, orientation and proximity (distance away) of the article from the camera on-board the user device. In some cases, the information can instruct the user about the presentation pose and proper placement or location in the field of view of the camera.

In some embodiments, the user device can display assigned content when the user is in a prescribed location even before the user has purchased or licensed the rights to view the assigned content. For example, the user may view the assigned content when inside the geofence of a store, museum or other venue, or in the presence of a beacon located at such a venue, but the user only may view the assigned content outside of the location after the user has acquired the rights to do so. The user may acquire these rights by purchasing the article bundled with a token representing the assigned content. After the user has acquired such rights, then the user may view the assigned content outside of the prescribed location. This is particularly important to enable a retailer to sell digital content on location at the store, allowing users to view a larger inventory of digital content at the retail store and purchase the rights to view the digital content at home only a desired selection of items.

Many types of articles qualify for the purposes of the present invention. Most common ones include articles of clothing such as sneakers, shoes, hats, and still other wearable items. Jewelry, adornments, ornaments and still other accoutrements also qualify as suitable articles. More generally, manipulatable items such as cards, placards, printed materials or objects that can be appropriately moved and presented by the user in their hand to the camera of the user device also satisfy the condition. Finally, articles that include an augmented reality (AR) anchor including a detectable image or pattern or a QR (quick recognition) code are also suitable articles. In the case of such articles they may be available only in certain environments or settings. For example, articles of this type may be present in environments or venues including in-store, at a performance, at a social venue, in a museum and at still other designated or specific environments. Rules may be prescribed for how, when, where and how many times a user can view the digital content associated with the article.

In a preferred embodiment the token is a non-fungible token (NFT). The NFT can be stored on the user device. Alternatively, the NFT can be located in the user's account or digital wallet. In either case, the rights verification module finds and accesses the NFT to confirm and authenticate cryptographically on the blockchain the user's ownership of the article or the digital content associated with the article based on the NFT. Ownership can be either explicit ownership of the token or possession of the rights to view the digital content associated with the article based on a license or "smart contract" with rules described in the blockchain, including but limited to time and location restriction, duration, number of views, and whether the NFT or the article can be borrowed, rented, sold, shared or given away.

In many practical applications the user is active in a marketplace. The user can transact in the marketplace and use the token in such transactions. The transactions extend to all possible trades and outright sales. In any case, the transactions are recorded on the blockchain to track the user's ownership or rights status. When the user engages in a sale transaction and sells their token, then the system recognizes this event when the sale is recorded on the blockchain. When the rights verification module finds the sale recorded on the blockchain it ensures that the user loses access to the assigned content.

In accordance with a method of the invention the user is equipped with the manipulated user device of their choice but having at least one camera such that the article presented by the user can be identified. The method can be performed locally on the manipulated device or in a distributed fashion by performing certain steps on a remote server. This is especially advantageous when the user device is not provisioned with sufficient resources to recognize the presented object and/or to attach labels and/or pose tags.

Still another method of the invention focuses on accessing content by a user equipped with the manipulated device. Here, the valid spatial relationship is used for permitting the user to access assigned content.

The present invention, including the preferred embodiment, will now be described in detail in the below detailed description with reference to the attached drawing figures.

BRIEF DESCRIPTION OF THE DRAWING FIGURES

FIGS. 6A-E are schematic diagrams showing an embodiment in which simple pose parameters including partial orientation and/or position as well as proximity are used to determine whether an article is validly worn.

Figure 7A:
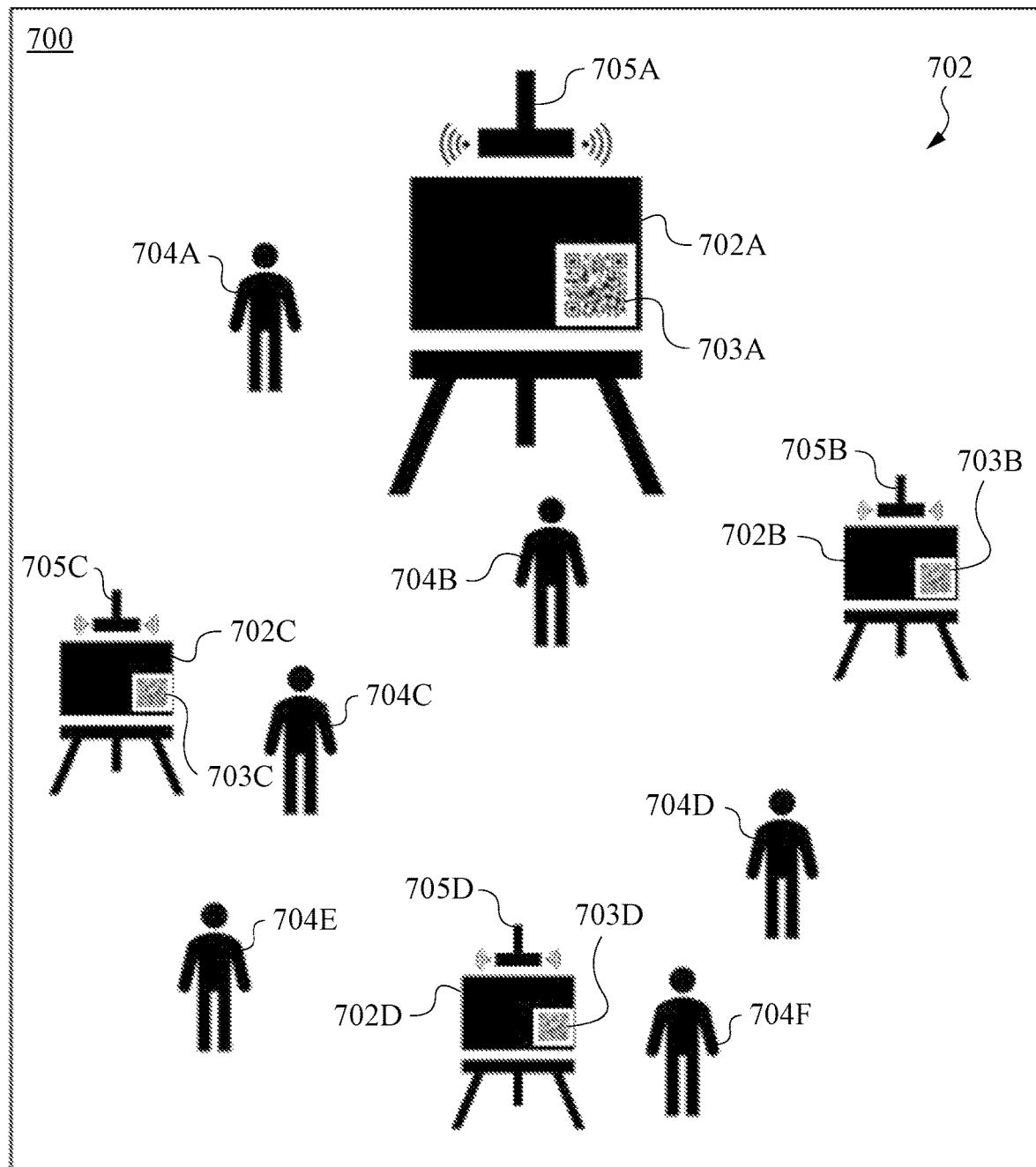
Figure 7B:
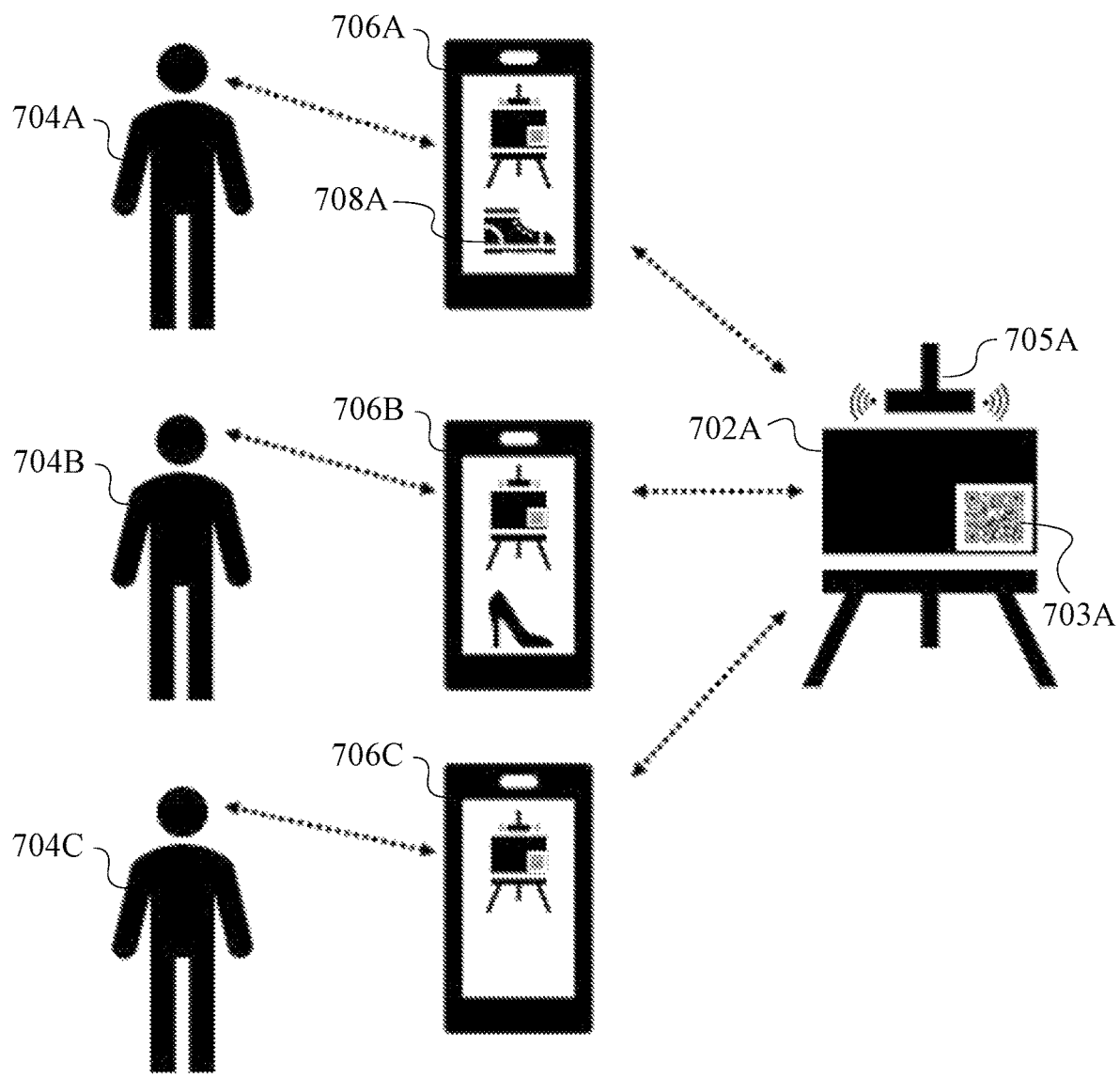

FIGS. 7A-B are diagrams illustrating a contextual application of the invention where the location is a museum hosting an art installation.

Figure 8A:
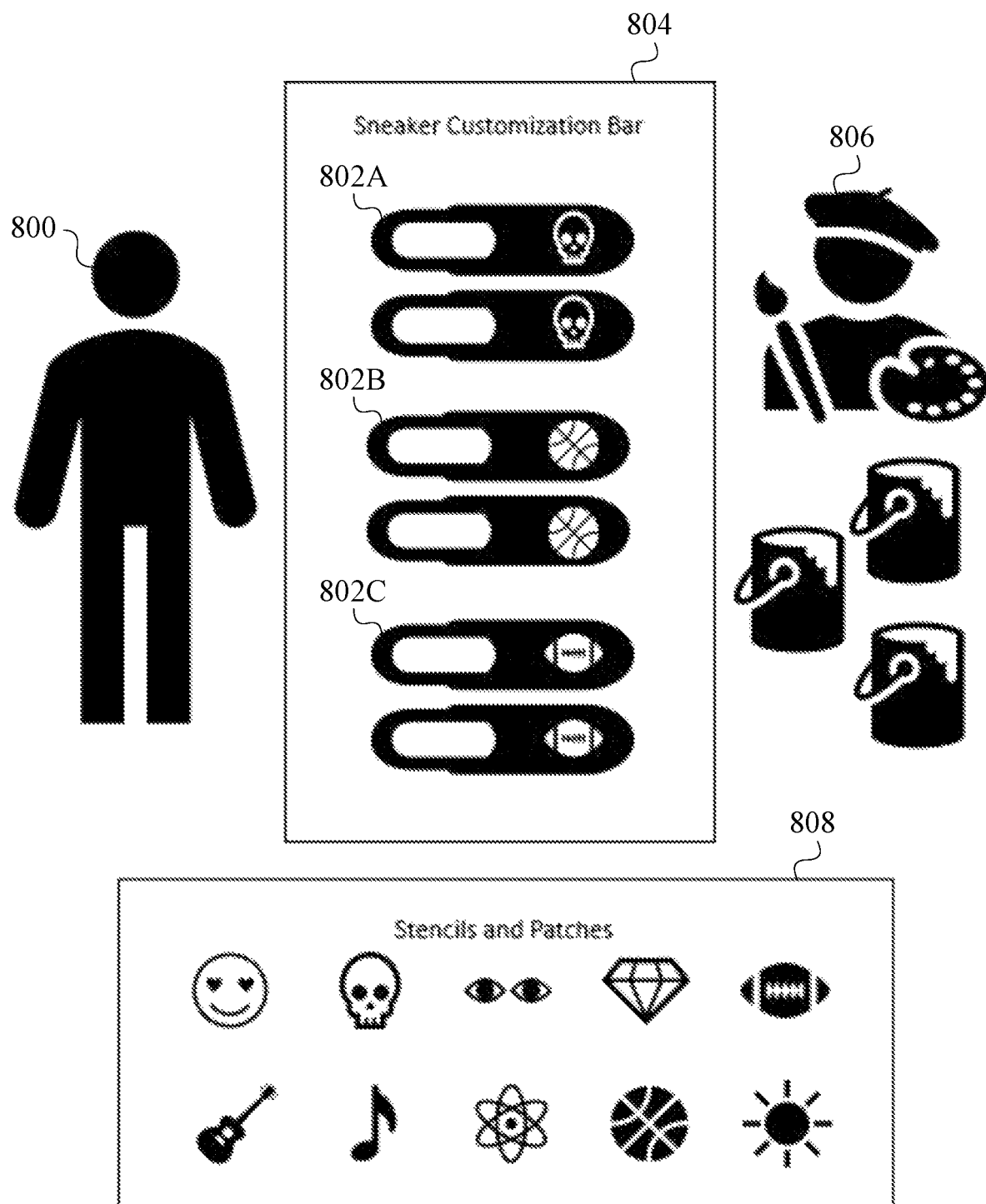

FIG. 8A is a diagram showing the use of customization attributes associated with validly worn articles for additional tuning of user content.

Figure 8B:
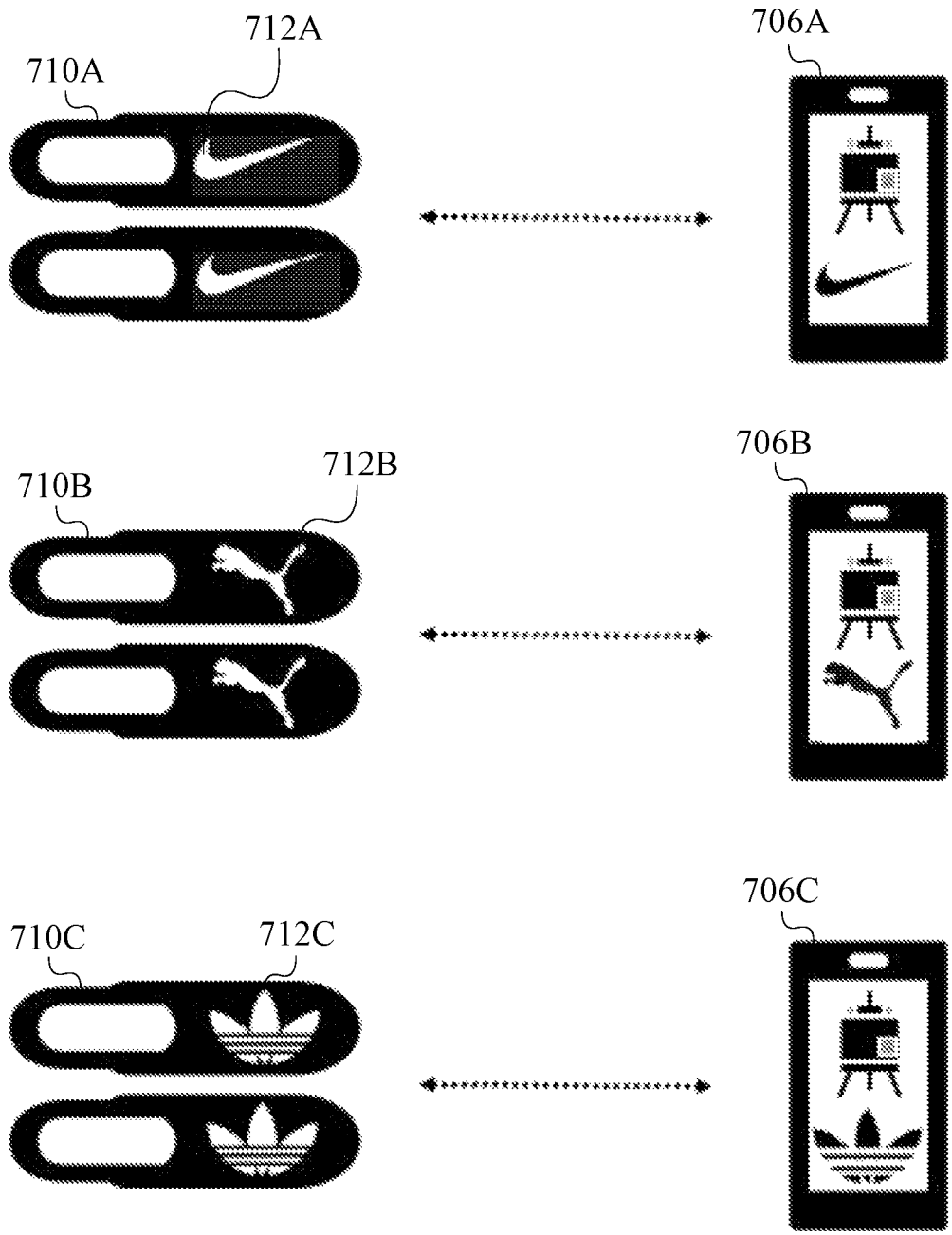

FIG. 8B is a diagram showing the use of customization attributes in releasing user content in the context of the museum hosting the art installation shown in FIG. 7A.

Figure 9:
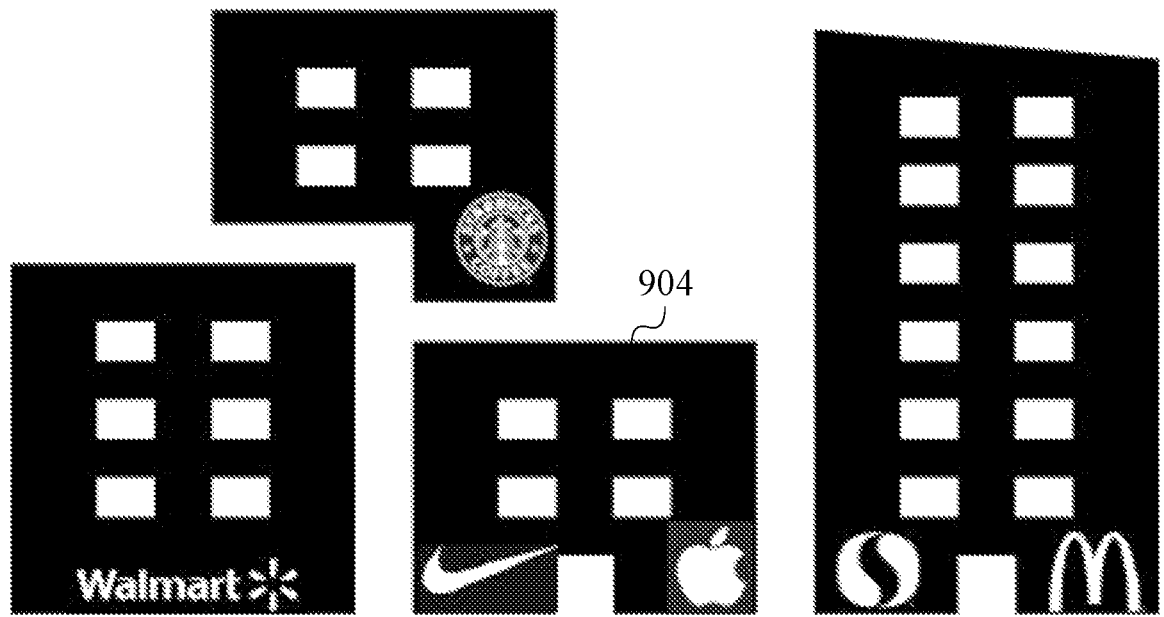
Figure 9:
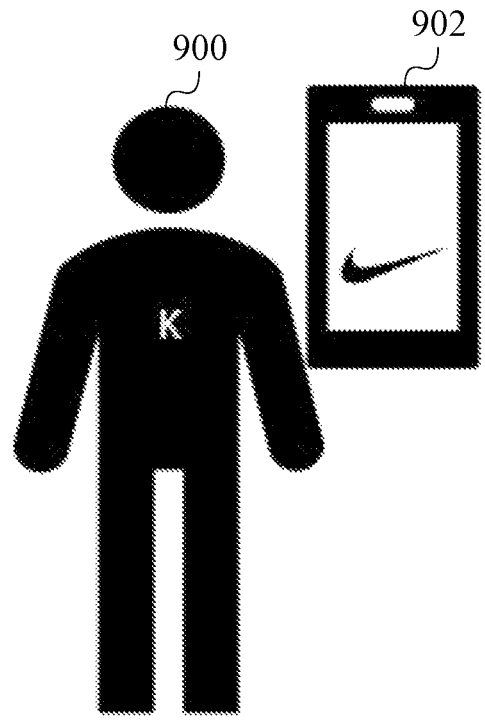

FIG. 9 is a diagram showing how confirmation of a validly worn article is used to provide the user with special offers at certain locations.

Figure 10A:
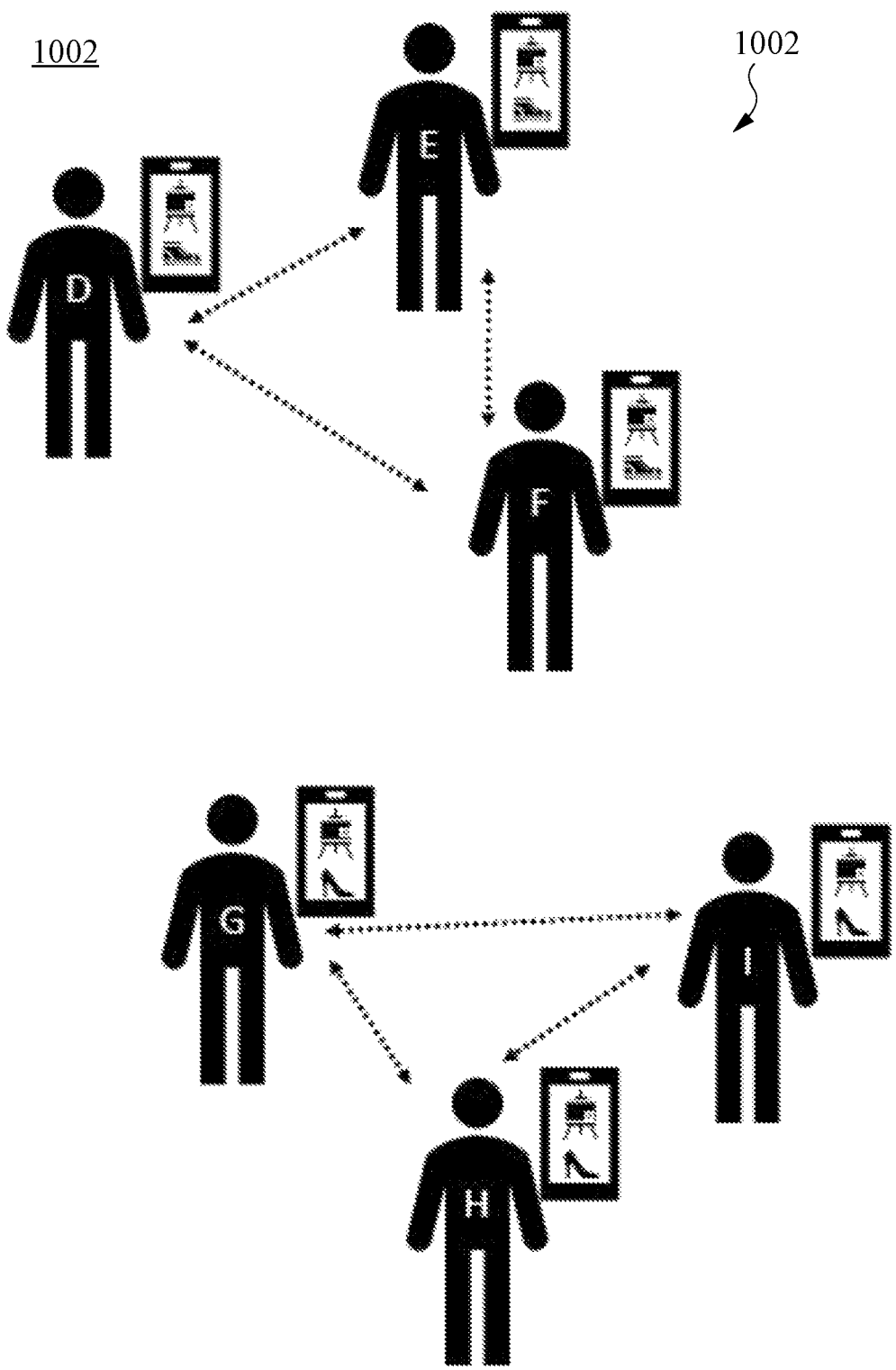
Figure 10B:
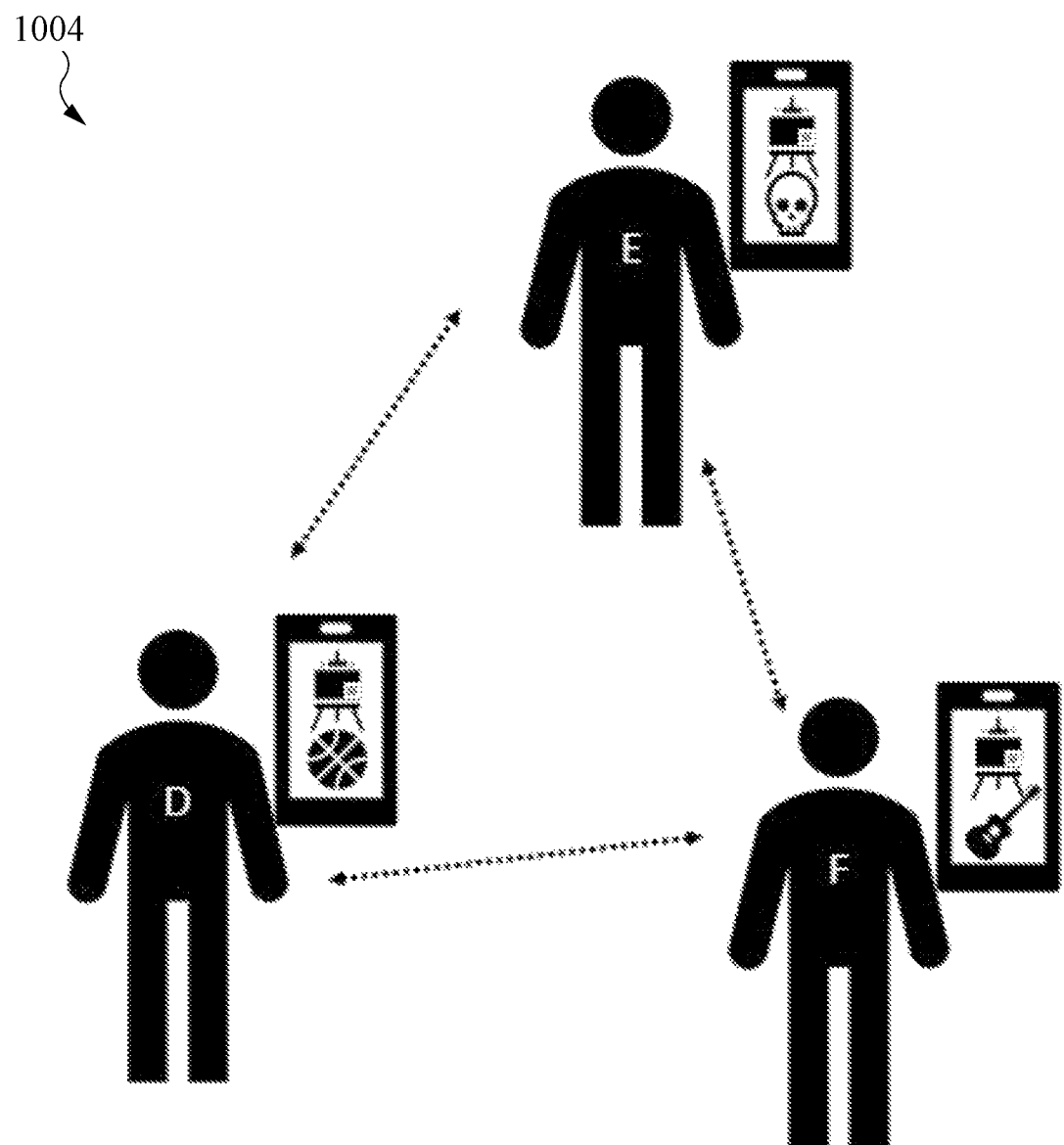

FIGS. 10A-B are diagrams illustrating how confirmation of a validly worn article in conjunction with customizable attributes is used to promote the formation of social networks.

Figure 11A:
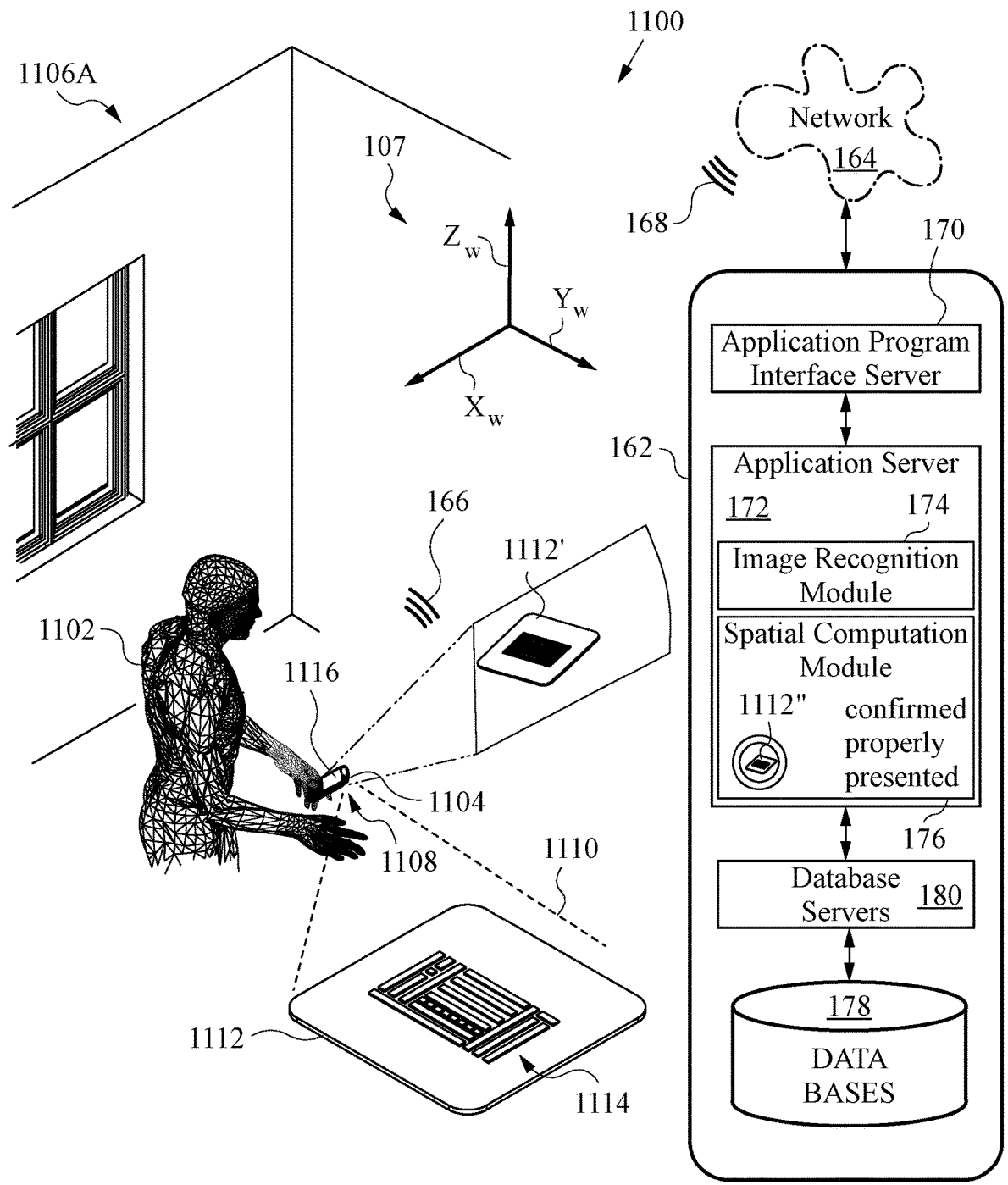
Figure 11B:
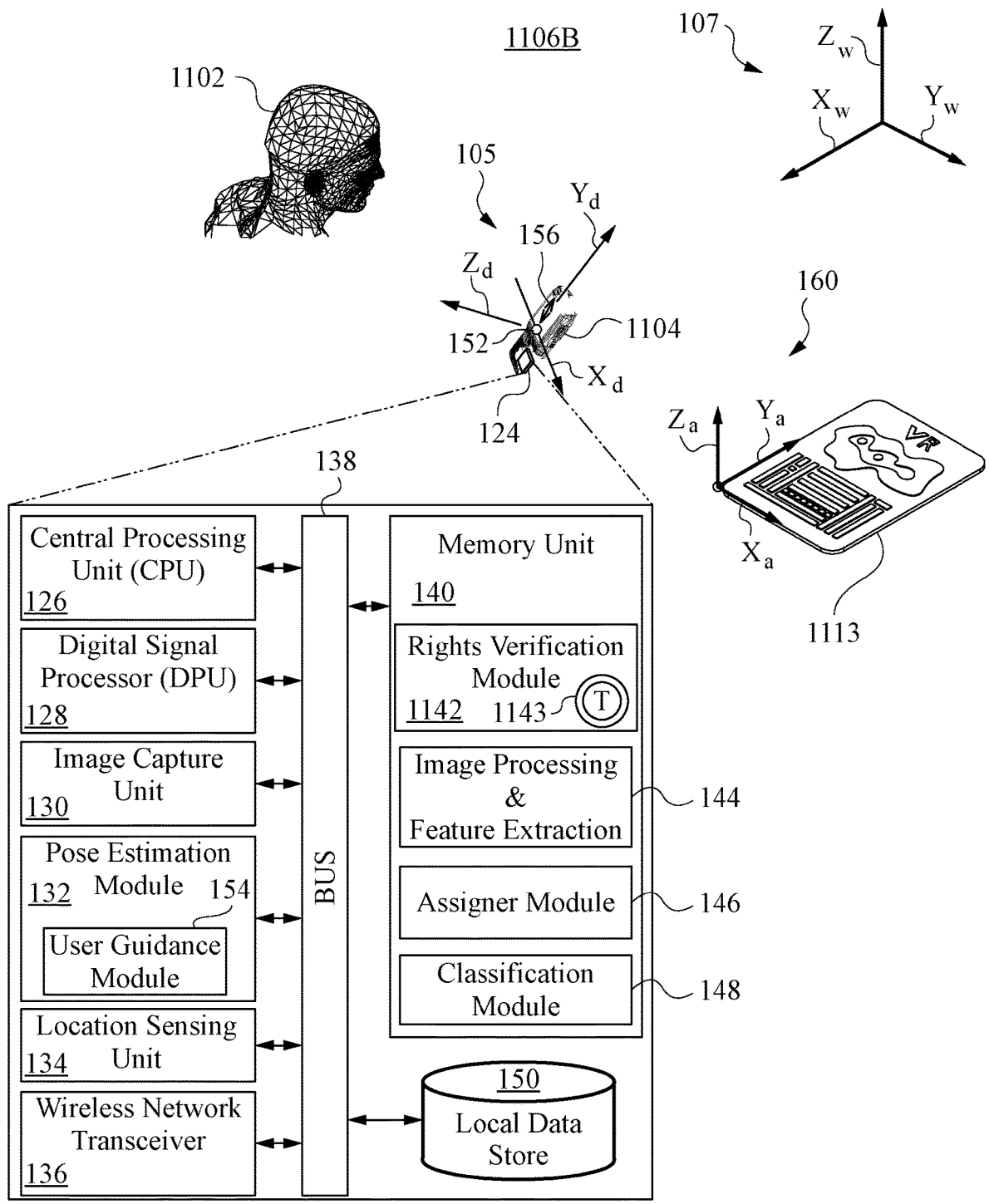

FIGS. 11A-B are schematic views illustrating the operation of a system that verifies user's ownership of or rights to an article in embodiments that use a two-pronged condition to grant access to assigned content.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1A:
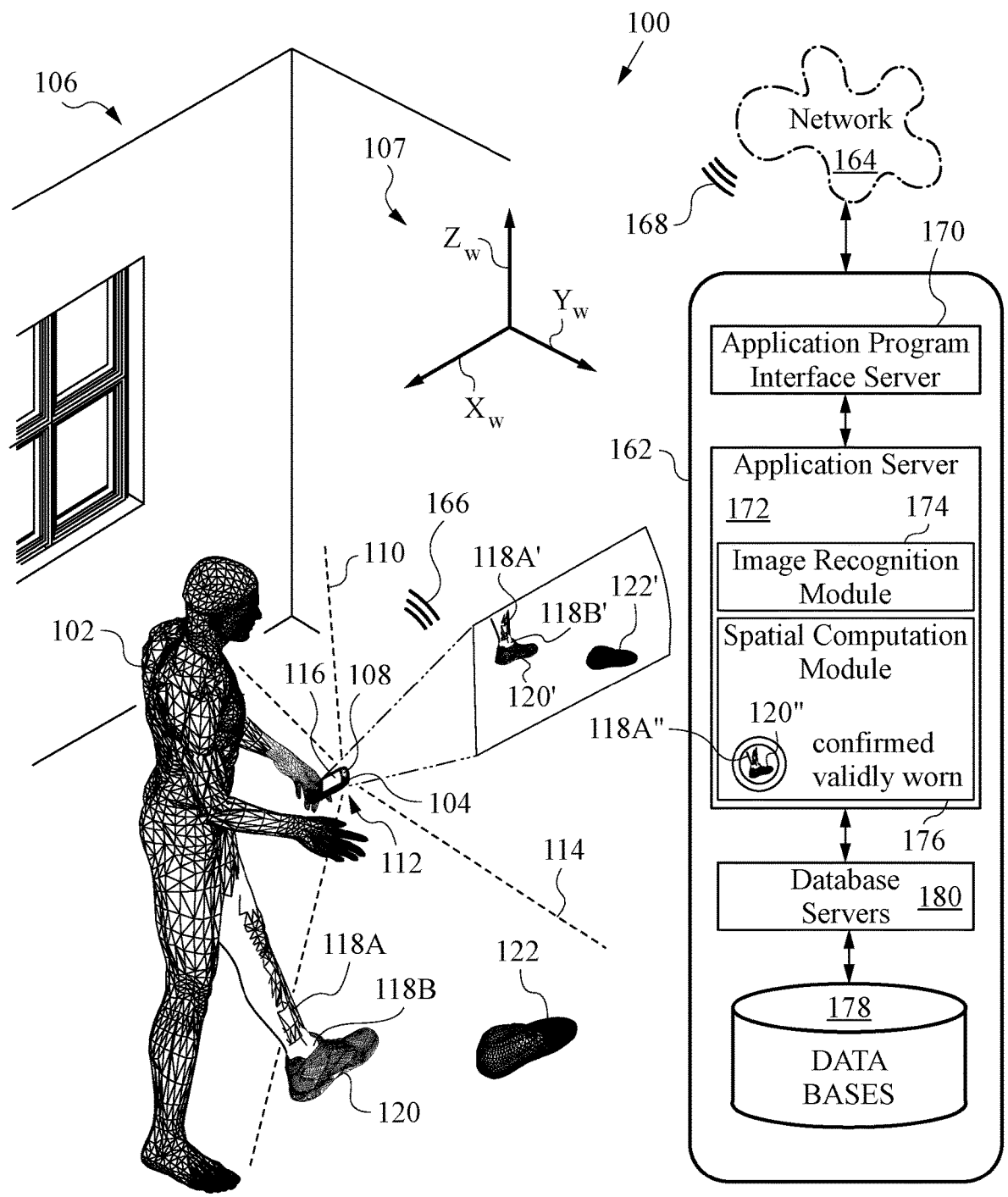
FIG. 1A is a schematic view illustrating a user with a manipulated user device operating within a system in accordance with the invention.

FIG. 1A is a schematic view showing an exemplary system 100 according to the invention in which a user 102 deploys a manipulated user device 104. User 102 resides in an environment 106 that is indoors. In general, environment 106 can be outdoors or indoors and it can be a public venue or a private venue. In the present case, environment 106 is a shoe store. A coordinate system 107 is used to describe positions and orientations in environment 106. Although any type of coordinate systems and/or conventions can be used, the present embodiment employs Cartesian coordinates in system 107 for clarity and ease of explanation. Cartesian system 107 has three mutually perpendicular axes $X_w$, $Y_w$, $Z_w$.

The subscripts "w" are used to denote that coordinate system 107 represents world coordinates that parameterize environment 106.

User 102 will typically choose a very portable device, such as their smart phone, pad, tablet or still other easy to manipulate electronic device as the manipulated user device 104 to use in system 100. In the present embodiment manipulated user device 104 is a smart phone that user 102 holds in their hand. Smart phone 104 has a back camera 108 whose field of view 110 is oriented up and in the direction of the head of user 102, given the way in which user 102 is holding smart phone 104. Smart phone 104 also has a front camera 112 (not visible in FIG. 1A) whose field of view 114 is oriented down and in the direction of the lower torso and legs of user 102. Of course, user 102 can manipulate smart phone 104 such that field of view 110 of back camera 108 and field of view 114 of front camera 112 can capture different parts of user 102 and of environment 106.

Smart phone 104 has a display screen 116 which is also shown in an enlarged view connected by dashed and dotted lines such that items in field of view 114 of front camera 112 are clearly visible. Specifically, user 102 is holding smart phone 104 in such a way that body parts 118A, 118B, in the present case the leg and foot of user 102 are in field of view 114 and are thus imaged by front camera 112 and displayed on screen 116. Similarly, an article 120 worn by user 102 on foot 118B are in field of view 114 as well. Therefore, article 120, in the present example embodied by a shoe or a sneaker, is imaged by front camera 112 and shown on display screen 116. More precisely, an image 120' of shoe 120 worn by user 102 and images 118A', 118B' of user's leg and foot 118A, 118B are displayed on screen 116. An image 122' of another shoe 122 also in field of view 114 but not presently worn by user 102 also appears on screen 116. In order to distinguish an image from the object itself the reference numeral corresponding to the image is denoted with a prime (').

Figure 1B:
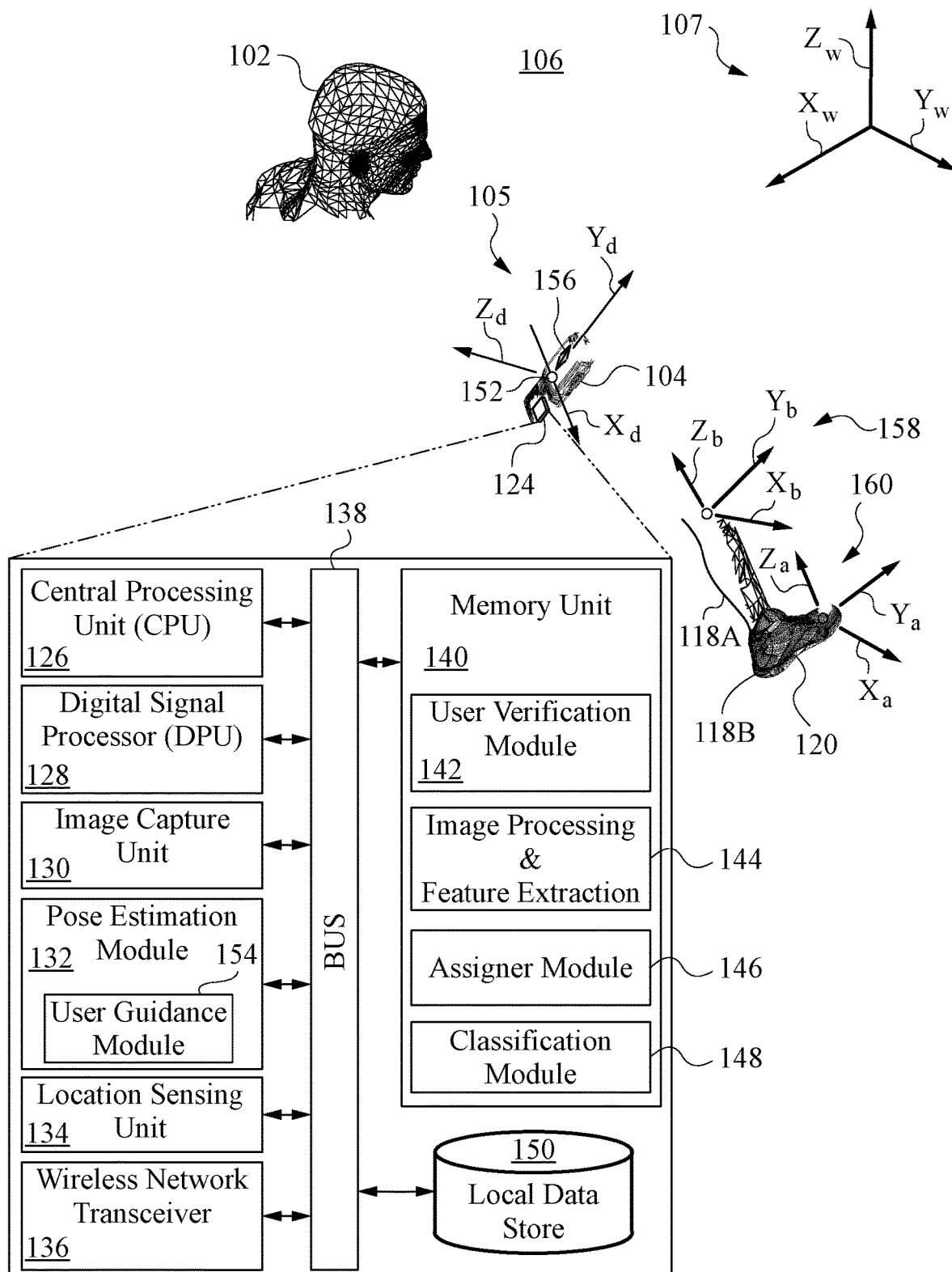
FIG. 1B is a schematic view and diagram illustrating in more detail several aspects of the system of FIG. 1A.

FIG. 1B is a schematic view and diagram illustrating in more detail several aspects of system 100 shown in FIG. 1A. In particular, FIG. 1B shows in more detail on-board computational resources 124 of user's manipulated device here embodied by smart phone 104. Resources 124 include a central processing unit (CPU) 126, a digital signal processor (DSP) 128, an image capture unit 130, a pose estimation module 132, a location sensing unit 134 and a wireless network transceiver 136. A bus 138 interconnects CPU 126, DSP 128, image capture unit 130, pose estimation module 132, location sensing unit 134 and transceiver 136 such that all of these resources can communicate and cooperate with each other.

Further, resources 124 also include a memory unit 140 connected to bus 138. Memory unit 140 has several specific modules used by system 100.

These specific modules include a user verification module 142, an image processing and feature extraction module 144, an assigner module 146 and a classification module 148. A local data store 150 is also among on-board computational resources 124. Data store 150 is connected to bus 138 such that it can communicate with any other computational resources 124 on-board smart phone 104.

It should be noted that although pose estimation module 132 resides among on-board computational resources 124 in system 100 it is possible to perform an off-board pose recovery with a different pose estimation module located in environment 106. Systems that perform such recovery are referred to as outside-in systems and are known to those skilled in the art. Meanwhile, systems with on-board pose recovery are commonly referred to as inside-out systems. Either approach can be used in the embodiments of the present invention, although the inside-out approach is typically faster and more robust than the outside-in approach.

Pose is a technical term used by those skilled in the art to cover both position and orientation of an item or object of interest. Knowledge of the pose of smart phone 104 fully describes its physical location and orientation in environment 106. In the present embodiment pose is expressed with respect to world coordinates 107 that describe environment 106. More precisely, pose estimation involves recovery of the relative displacement and rotation of device coordinates 105 attached to smart phone 104 with respect to world coordinates 107.

Device coordinates 105 are Cartesian and have mutually perpendicular axes $X_d, Y_d, Z_d$ where the subscript "d" stands for device. The origin of device coordinates 105 is taken at a center point 152 of smart phone 104. Point 152 can be the center of mass or any other convenient point of reference of smart phone 104. Recovery of pose of smart phone 104 in environment 106 is thus tantamount to an estimation of the offset of the origin of device coordinates 105, i.e., of point 152, from an origin of world coordinates 107 and an estimation of the rotations of device axes $X_d, Y_d, Z_d$ with respect to world axes $X_w, Y_w, Z_w$. The details of pose recovery and estimation techniques are known to those skilled in the art and will not be covered herein.

Changes in pose describe all the possible movements that smart phone 104 can experience by being either moved linearly and/or rotated about any arbitrary axis by user 102.

In the present embodiment, pose estimation module 132 relies on data obtained from front camera 112 and/or from back camera 108, and in particular on one but preferably a number of images taken by either one or both cameras 112, 108. In addition, pose estimation module 132 relies on data from auxiliary sensors located on-board smart phone 104. Suitable auxiliary sensors include inertial units (gyros and/or accelerometers), magnetic units, acoustic units and/or still other relative or absolute position and motion sensing units. Such auxiliary sensors are standard devices (typically MEMS devices) in smart phones and other user devices and are thus not explicitly shown.

Pose estimation module 132 takes data from front and back cameras 112, 108 and in particular from images taken by cameras 112, 108 and from any auxiliary sensor(s) and estimates the pose of smart phone 104.

Optical data from images is typically used to obtain ground truth and relative motion data from auxiliary sensor(s) is used to interpolate the pose between times when ground truth is recovered. Additionally, various processing techniques such as sensor fusion can be deployed by pose estimation module 132 to estimate the pose of smart phone 104 at any time. In other words, at certain points in time only data from auxiliary sensors may be used for pose estimation. Persons skilled in the art will be familiar with the many techniques available to obtain estimates of pose of smart phone 104.

System 100 has a user guidance module 154 also residing on-board smart phone 104. In the present embodiment user guidance module 154 is integrated with pose estimation module 132 because this approach is efficient. However, guidance module 154 can be separate from pose estimation module 132 and can even reside off-board in situations where low-latency wireless connections and resources are present. For example, with transceiver 136 operating on a fast 5G network guidance module 154 can be located on a remote resource belonging to system 100.

User guidance module 154 is designed for providing user 102 with instructions about a relative placement of worn article, in this case of sneaker 120 worn on foot 118B with respect to front camera 112. For example, user guidance module 154 can display a fiducial feature or an alignment aid 156 to user 102 on display screen 106 of smart phone 104.

Fiducial feature 156 in the present case is an alignment arrow that helps user 102 in placing sneaker 120 worn on foot 118B in a presentation pose for front camera 112. In other words, fiducial feature 156 is designed to help user 102 to move or adjust the position of their leg 118A and foot 118B so that sneaker 120 is placed in a proper presentation pose such that front camera 112 can obtain a good image. Proper presentation pose may be determined from attributes that include correct positioning in field of view 114 of front camera 112 that is taking the image or images. In addition, proper presentation pose will optimize for proper lighting, proper line-of-sight (reduced occlusion) and/or any other attributes that ensure that sneaker 120 can be processed to become a recognized article by system 100.

In the present embodiment, image processing and feature extraction module 144 has the additional capabilities of an image recognition module. Module 144 is used to extract body parts 118A, 118B of user 102 from one or more images taken by front camera 112. Thus, system 100 uses image processing and feature extraction module 144 for determining body pose estimates of extracted body parts 118A, 118B spatially associated with sneaker 120. Of course, in any embodiment, the most useful body parts to extract from images are anatomical features that are spatially associated with the worn article. Thus, foot 118B and leg 118A or even a knee (not shown) are useful body parts to extract from the images. The exact choice of body parts to extract from camera images will depend on what type of article 120 is being worn as well as where and how it is worn by user 102.

The body pose estimates can be partial, as can also be the case for the recognized article, or more complete ranging up to full pose recovery (all position and orientation parameters of the body parts, also known as the six degrees of freedom). FIG. 1B illustrates an additional body coordinate system 158 and an article coordinate system 160 that can be used for full pose recovery of leg 118A and of sneaker 120 worn on foot 118B. As before, coordinate systems 158, 160 are cartesian with origins chosen at convenient points on leg 118A and sneaker 120, respectively. For anatomical reasons, the origin of body coordinates 160 anchoring the pose of leg 118A are chosen under the knee at a location that is fixed or stable in spatial relation to foot 118B, no matter how user 102 moves his or her body. For clarity, axes $X_b$, $Y_b$, $Z_b$ of body coordinates 158 are designated with subscript "b" to denote body. Similarly, axes $X_a$, $Y_a$, $Z_a$ of article coordinates 160 are designated with subscript "a" to denote article.

It should be noted that all pose recoveries may be performed in or translated into world coordinates 107, or they may be expressed relative to any other coordinates, as found convenient in operating system 100.

For example, for a casual or low-level verification according to the method it may be sufficient to recover only a partial and/or relative pose of leg 118A and sneaker 120 with respect to smart phone 104, or of the leg 118A with respect to sneaker 120. In such cases knowing the relationship between body coordinates 158 and article coordinates 160 can be sufficient. In other cases, a more complete knowledge of the relationship of body coordinates 158 and article coordinates 160 with respect to device coordinates 105 and/or even with respect to world coordinates 107 may be required for highly robust validation that sneaker 120 is properly worn on foot 118B by user 102. The details of necessary level of recovery will be described in more detail below in the section describing the operation of system 100.

Returning to FIG. 1A, it is seen that system 100 also has a remote part located in a remote server or facility 162. In other words, system 100 is a distributed system with remote resources. Communications between smart phone 104 and facility 162 are supported by a network 164.

Suitable uplink signals 166 and downlink signals 168 are used to transmit the requisite information between smart phone 104 and facility 162 via network 164 to operate system 100 as described in more detail below.

Remote facility 162 has an application program interface server 170 (API server) that manages the overall coordination between smart phone 104 and resources necessary to practice the method. The actual remote part of the application resides on an application server 172.

Application server 172 has an image recognition module 174, which can either cooperate with image processing and feature extraction module 144 (see FIG. 1B) on-board smart phone 104 to provide the requisite image recognition capabilities or provide all the requisite image recognition capabilities by itself. Alternatively, as described above, the function of image recognition can be entirely performed by image processing and feature extraction module 144 on-board smart phone 104 rather than remote from it. A person skilled in the art will appreciate that image recognition can be a computationally challenging task and that in some cases performing it entirely remotely by image recognition module 174 will be the most efficient way for ensuring reliable operation of system 100.

Application server 172 also has a spatial computation module 176 that obtains information from image recognition module 174 and from pose estimation module 132 (see FIG. 1B). Spatial computation module 176 is further in communication with one or more data bases 178 via database servers 180. Data bases 178 provide necessary article-related and spatial information to enable spatial computation module 176 to estimate whether an anatomically valid relationship exists between recognized article, in the present example sneaker 120 and user 102. More precisely, they enable spatial computation module 176 to recognize whether user 102 is properly wearing sneaker 120 on his or her foot 118B and thus confirm that article 120 of interest is validly worn.

In order to enable such recognition, data bases 178 contain reference images of all possible articles that user 102 could be wearing. In the present example, data bases 178 contain reference images of all possible sneakers that user 102 could own. Preferably, such reference images are provided for many canonical reference poses to enable recognition within a wide range of possible poses that sneaker 120 could assume with respect to smart phone 104 while being validly worn on user's foot 118B. Similarly, data bases 178 contain reference images of body parts in canonical reference poses to enable recognition of a body part or parts associated with the article worn by user 102.

An exemplary method of operating system 100 will now be described in reference to FIGS. 1A-B. It should be noted that system 100 can support many modes of operation and can be adapted to many types of environments, articles and users. Furthermore, as already indicated above, the capabilities of the various on-board and remote resources can be re-configured, partitioned or entirely delegated to a single on-board or remote module depending on the application, as will be apparent to one skilled in the art.

In the particular mode of operation shown in FIGS. 1A-B system 100 is used to confirm that article 120, in this case sneaker 120, is validly worn by user 102. This validation or confirmation is used by system 100 as a gating factor for making content available to user 102. Thus, it is important that user 102 upon entering environment 106, here a shoe store, equipped with smart phone 104 can validate within system 100 that he or she is validly wearing sneaker 120. Preferably, location sensing unit 134 on-board smart phone 104 is used to validate location inside store 106. This may be performed by using GPS or even optically by imaging and recognizing store 106 from images.

To perform the validation user 102 manipulates smart phone 104 such that sneaker 120 is in field of view 114 of front camera 112. At this point, image capture unit 130 on-board smart phone 104 captures from front camera 112 one or more images (e.g., calibration images or actual images) of items within field of view 114. Items within field of view 114 include user's leg 118A, user's foot 118B, sneaker 120 on user's foot 118B and another sneaker or shoe 122 that user 102 is not wearing.

Other items in field of view 114 that may include shelves, walls and floor and various fixtures and still other items in store 106 are left out of consideration for reasons of clarity.

Image capture unit 130 communicates the raw or calibrated image(s) to pose estimation module 132 via bus 138. Pose estimation module 132 cooperates via bus 138 with image processing and feature extraction module 144. The latter allows to identify and extract images of article 120', of user's leg 118A' and, if required, of visible portions of user's foot 118B'. These processes involve steps such as image segmentation, image conditioning (e.g., de-warping, filtering, contrast adjustment, white level correction, etc.), line detection, corner detection and other steps well known in the art of computational vision. Since many of these tasks are computationally intensive they are performed with the aid of CPU 126 and DPU 128 that are also on bus 138.

Once the images are identified, pose estimation module 132 deploys a pose estimation technique to obtain an article pose estimate for sneaker 120 and a body pose estimate of user's leg 118B. It then communicates these article and body pose estimates to user guidance module 154. In turn, guidance module 154 displays alignment aid or fiducial 156 to user 102 on screen 116 of smart phone 104.

User looks at fiducial 156 displayed along with sneaker image 120' and leg image 118A' to ensure that sneaker 120 is in a desired presentation pose within field of view 114 of front camera 112 to proceed to validation that sneaker 120 is validly worn. User 102 then adjusts the position of their leg 118A and foot 118B so that sneaker 120 is placed in a proper presentation pose such that front camera 112 can obtain a good image.

As mentioned above, proper presentation pose may be determined from attributes that include correct positioning in field of view 114 of front camera 112 that is taking the image or images and delivering them to image capture unit 130. In addition, proper presentation pose will optimize for proper lighting, proper line-of-sight (reduced occlusion) and/or any other attributes that ensure that sneaker 120 can be processed to become a recognized article by system 100. These attributes can be obtained from the raw or calibrated image(s) in accordance with image pre-processing and conditioning techniques known in the art.

Once user 102 has aligned sneaker 120 with fiducial 156 and thus placed it in proper presentation pose front camera 112 takes one or more images that contain sneaker images 120' and leg images 118A'. These images are captured by image capture unit 130 and sent on for validation. To perform validation, capture unit 130 sends images 120', 118A', and if available 118B' to pose estimation module 132, as before. Then, in cooperation with CPU 126, DPU 128, as well as image processing and feature extraction unit 144 pose estimation module 132 obtains an article pose estimate for sneaker 120 and body pose estimate for leg 118A from their corresponding images 120', 118A'.

Next, images of sneaker 120' and of leg 118A' along with their respective article and body pose estimates are sent off-board smart phone 104 to remote facility 162. This process is performed by wireless network transceiver 136 that sends the information on uplink signal 166 via network 164. At facility 162 API 170 receives images of sneaker 120' and of leg 118A' along with their respective article and body pose estimates and passes them to image recognition module 174 on application server 172. As mentioned above, image recognition module 174 can perform some or even all of the functions that are performed on-board by pose estimation module 132 and image processing and feature extraction module 144. This can be done to reduce the on-board processing load borne by smart phone 104 or to re-validate images 120', 118A' as well as article and body pose estimates. In the present embodiment image recognition module 174 performs a re-validation and further processing of images 120', 118A' to obtain more complete article and body pose estimates suitable for article recognition and body part recognition.

Once image recognition module 174 obtains images of article 120' and leg 118A' with sufficiently robust article and pose estimates to perform image-based matching it accesses data bases 178 via database servers 180. Data bases 178 contain reference images of all possible sneakers that user 102 could be wearing, including reference images for sneaker 120 in particular.

Reference images for sneaker 120 are provided for a number of canonical or reference poses that sneaker 120 could assume while being validly worn by user 102. For example, reference images of top, bottom, side, back and isometric views of sneaker 120 are available in data bases 178. Similarly, data bases 178 contain reference images of body parts in canonical or reference poses to enable recognition of one or more body parts, in the present example of user's leg 118A associated with sneaker 120 worn by user 102.

Image recognition module 172 uses the reference images from data bases 178 to run a matching algorithm or a best match comparison. In particular, module 172 finds the closest match for sneaker 120 by running the best matching algorithm against reference images form data bases 178. A similar approach is taken for finding a best match for body part, in this case leg 118A of user 102.

In some embodiments confirmation that sneaker 120 has been properly recognized from its image 120' can involve attaching an article label here sneaker label (not shown) to any image from front camera 112 in which sneaker 120 is confirmed found based on its image 120' through matching by image recognition module 172. A labelled image with sneaker label is considered a recognized sneaker 120" by system 100. For clarity, the double primes (") are used to indicate recognized articles, objects or body parts.

Similarly, a recognized leg 118A can be labelled with a body part label (not shown) and be considered a recognized leg 118A" of user 102 by system 100. Data bases 178 that use and attach article labels to the articles and allow spatial computation module 178 to use a best matching based on labelled images of articles are convenient because they can then just use the labels in communicating information about matched articles to reduce the amount of information that has to be transmitted between the resources of system 100.

In the next step, recognized sneaker 120" and recognized leg 118A" are passed from image recognition module 172 to spatial computation module 176. Spatial computation module 176 determines a spatial relationship between recognized sneaker 120" and recognized leg 118A" in the image or images from front camera 112. Spatial computation module 176 additionally uses pose estimation data obtained from auxiliary sensors on-board smart phone 104 in establishing the spatial relationship between recognized sneaker 120" and recognized leg 118A".

Once spatial computation module 176 establishes the spatial relationship between recognized sneaker 120" and recognized leg 118A", it proceeds to estimate whether the established spatial relationship is an anatomically valid spatial relationship between recognized sneaker 120" and recognized leg 118A". Depending on the level of robustness, the anatomically valid spatial relationship can include a match in some or all orientation parameters, or in some or all position parameters. In other words, spatial computation module 176 attempts to corroborate that the spatial relationship between article coordinate system 158 and body coordinate system 160 is anatomically valid for user 102 based on well-known constraints of human anatomy. The match can include alignment of some of the axes $X_b$, $Y_b$, $Z_b$ of body coordinates 158 and axes $X_a$, $Y_a$, $Z_a$ of article coordinates 160. The match can additionally or instead be based on an anatomically feasible amount of displacement between coordinate systems 158 and 160. Again, just a few parameters can be used or a full matching of all six degrees of freedom (position and orientation) may be performed by spatial computation module 176.

In fact, in a low-confidence estimate for validly worn sneaker 120 it is possible for spatial computation module 176 to include only some relative estimates of orientation or position, e.g., generally correct alignment between recognized sneaker 120" and recognized leg 118A". Thus, spatial computation module 176 determines whether it is likely that user 120 is properly wearing sneaker 120. The value of such estimate of an anatomically valid spatial relationship can be made with respect to a threshold or other statistical approach. A person skilled in the art will recognize that there are many confidence level measures and that they can be deployed based on the level of confidence required in any specific implementation of the method.

A successful confirmation of an anatomically valid spatial relationship between recognized sneaker 120" and recognized leg 118A" by spatial computation module 176 validates that recognized sneaker 120" is validly worn by user 102. This determination, when reached serves as a gating factor for granting user 102 access to various types of content. In fact, many of the key actions are performed by system 100 once module 176 confirms that sneaker 120 is correctly or validly worn by user 102. These subsequent actions that can be performed by system 100 in accordance with a method of invention are intended to personalize the experience of user 102 in store 106.

To release or assign appropriate and targeted content to user 102 that is confirmed to be validly wearing sneaker 120 system 100 uses assigner module 146 on-board smart phone 104 for assigning content to user 102. Assigner module 146 activates upon receiving confirmation from spatial computation module 176 that sneaker 120 is validly worn. In the present case, the content released by assigner module 146 is further based on a context in which sneaker 102 is recognized and determined to be validly worn by the user 102. In general, the context may include environment 106 where user 102 is present, the time when user is present in environment 106 and other attributes or factors associated with user 102, e.g., the purchase history or affiliations of user 102.

The additional attributes are preferably systematized and collectively treated as a classification of user 102. System 100 uses classification module 148 for performing the task of user classification or attaching a classification to user 102. In general, classification is a segmentation method that accounts for user interests, user peer group, user history and still other attributes such as affiliations. Classification module 148 communicates user classification to assigner module 146 to adjust the content made accessible to user 102 based on classification.

In the present exemplary embodiment user 102 is confirmed to be validly wearing sneaker 120 while at store 106 at the time of a special sale.

The content assigned to user 102 by assigner module 146 is a promotion or a discount on shoe 122. The promotion is set to expire when user 102 leaves store 106. This promotion is preferably displayed to user 102 on screen 116 of smart phone 104 to ensure safe receipt.

Alternatively, the promotion may be sent to user 102 via any suitable medium including e-mail or SMS or as a message on any suitable messaging platform such as Facebook or Snapchat.

In some methods system 100 also deploys user verification module 142 to verify the identity of user 102 while he or she is operating smart phone 104. This additional verification is used when determining that user 102 is validly wearing sneaker 120 is insufficient to release the content. Such situation may occur when smart phone 104 is being manipulated by another person who is not the user 102, e.g., the owner of smart phone 104 authorized to receive the intended content from assigner module 146, i.e., the promotion or discount on shoe 122 in the present example.

In some embodiments verification module 142 can verify a body part of user 102 that is extracted by image recognition module 144 from an image taken by back camera 108. For example, the body part can be the user's face and verification module 142 may be a face recognition and validation unit. Alternatively, a biometric fingerprint may be collected from user 102 by a suitable on-board apparatus (not shown) to verify the user's identity without any camera images. Still other verification procedures, including two-factor authentication or use of user codes can be implemented in alternative methods.

The above exemplary system and method admit of many embodiments that can be adapted to specific venues, user devices, worn articles and other parameters. For example, several advantageous implementations are possible in the case of user devices having front and back cameras as addressed below.

Figure 2A:
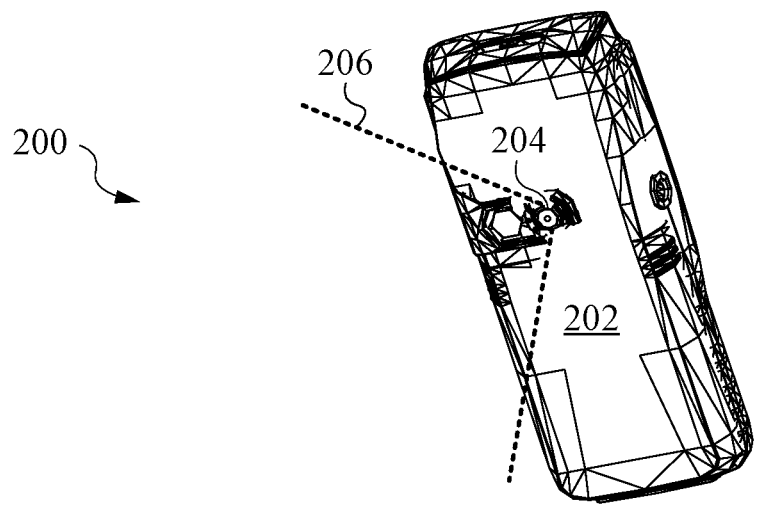
FIG. 2A is a perspective view of another manipulated user device showing its front side.
Figure 2B:
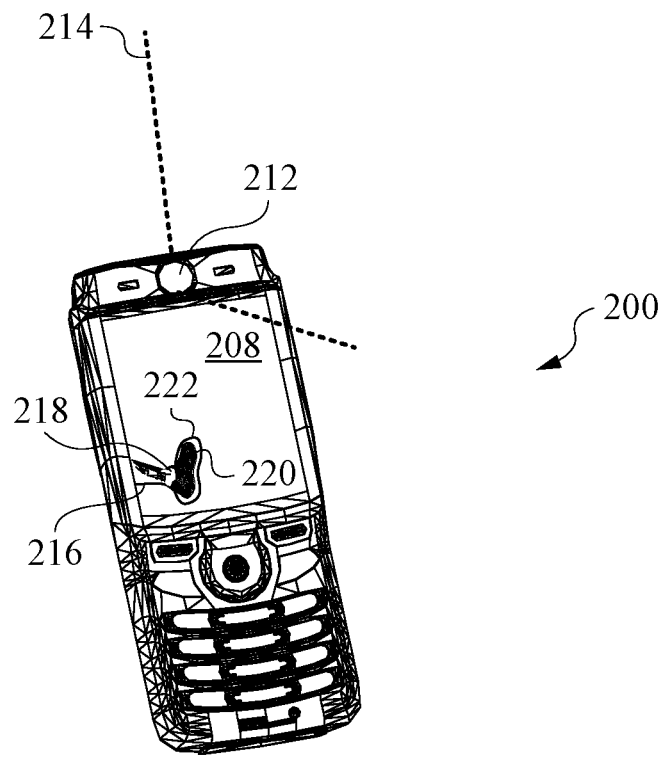
FIG. 2B is a perspective view of the manipulated user device of FIG. 2A showing its back side.

FIG. 2A-B are perspective views of a user device 200 with a front camera and a back camera. User device 200 is a smart phone in this embodiment and it may be deployed in system 100 or another system and/or method according to the invention.

FIG. 2A illustrates the side of smart phone 200 facing away from the user, also called front side 202. Front side 202 has a front camera 204 with a front field of view 206. Preferably, front field of view 206 has a sufficiently large field angle to capture articles of interest that the user wears while at the same time allowing the user to look at a display screen 208 (see FIG. 2B) of smart phone 200.

FIG. 2B illustrates a back side 210 of smart phone 200. Display screen 208 is on back side 210. A back camera 212 with a back field of view 214 is also mounted on back side 210. Back field of view 214 typically captures the user's upper body and head. In the present embodiment, screen 208 displays to the user a select set of items that are in front field of view 206 of front camera 204. These items include the user's leg 216 and foot 218 on which the user is wearing a sneaker 220. In addition, a fiducial 222 is displayed to the user around sneaker 220.

Unlike the simple fiducial shown in the previous embodiment, fiducial 222 outlines to the user in detail how to present sneaker 220 to aid in validation that sneaker 220 is validly worn so that personalized content can be released to the user.

Figure 3:
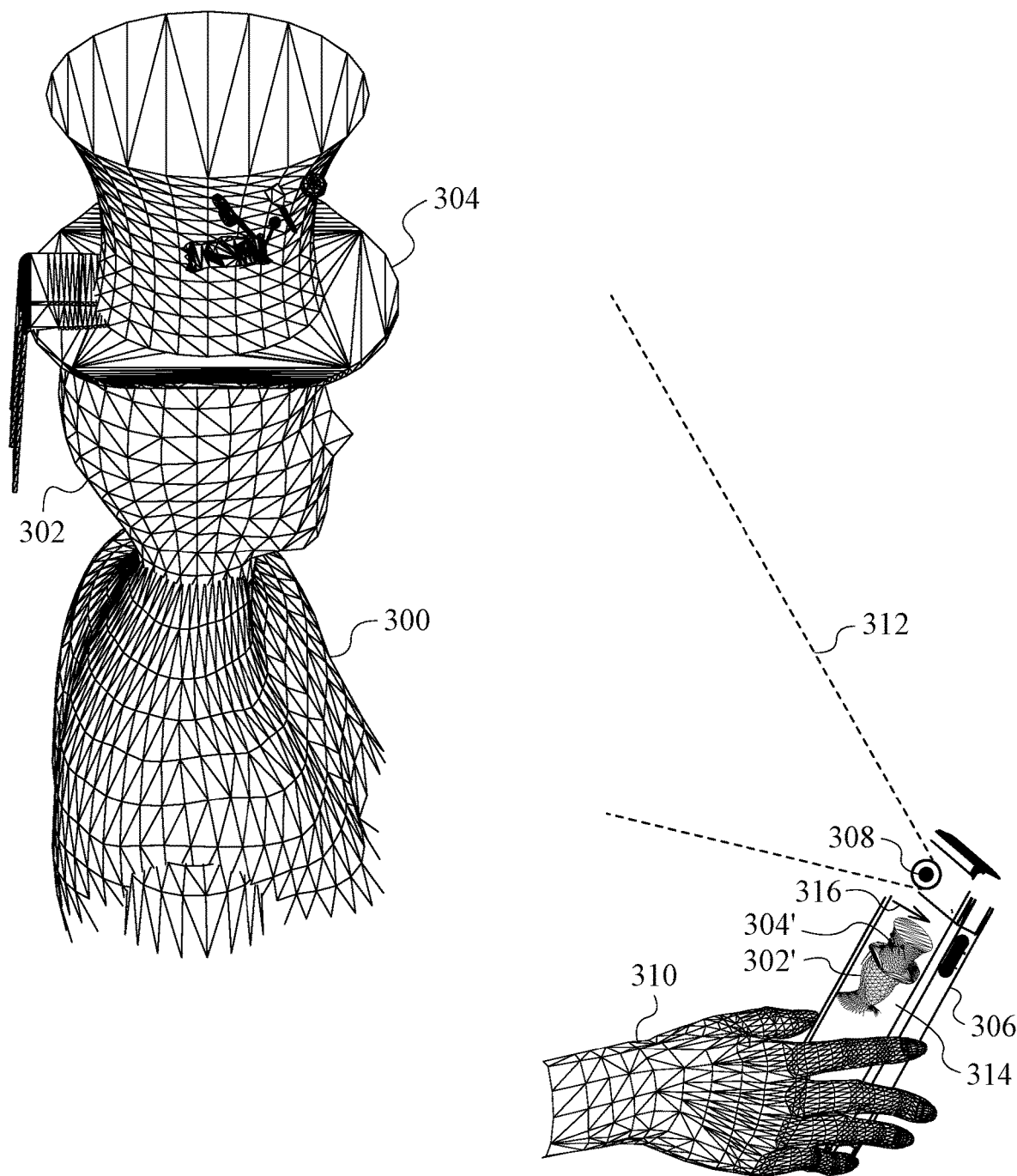
FIG. 3 is a schematic view showing an embodiment in which a head-worn article is confirmed as validly worn.

FIG. 3 is a schematic view showing an embodiment in which a head-worn article is confirmed as validly worn. A user 300 is wearing on their head 302 a hat 304 and holding a manipulated user device 306 embodied by a smart phone. Only a back camera 308 of smart phone 306 is used in this embodiment. User 300 holds smart phone 306 in their hand 310 such that a field of view 312 of back camera 310 captures user's head 302 and hat 304. An image of head 302' and of hat 304' are displayed to user 300 on a display screen 314 of smart phone 306.

In accordance with the method a fiducial 316 in the form of an arrow is displayed to user 300. Arrow 316 shows user 300 how to adjust the position of hat 304 on their head 302 to aid in validation that hat 304 is indeed properly worn. In this example, fiducial feature 316 is displayed in field of view 312 of base camera 310 since hat 304 is on user's head 302. However, a fiducial feature can be displayed in the field of view of the front camera or the back camera depending on specific use case, and more precisely depending on which body part the article is to be confirmed as being validly worn.

Figure 4:
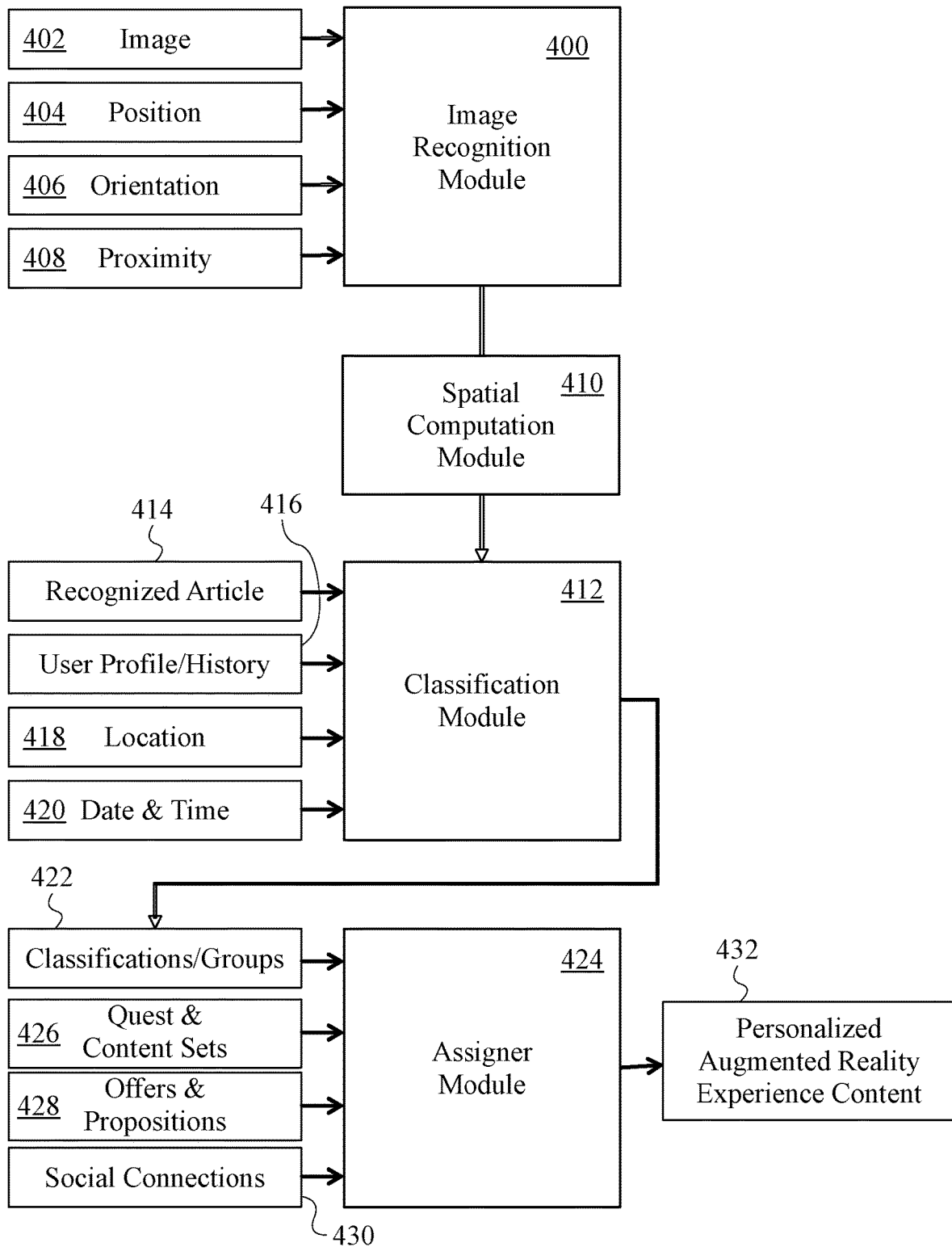
FIG. 4 is a flow diagram illustrating another method according to the invention.

FIG. 4 is a flow diagram illustrating another method according to the invention that may be deployed in system 100 or in still another system for validating articles as validly worn by a user. In the method shown in FIG. 4 an image recognition module 400 receives four inputs. The first input is an image 402 that contains the article to be confirmed as validly worn. The second input is an estimate of position 404 of the article to be confirmed as validly worn. Preferably, for more efficient processing by the system estimate of position 404 is in the form of an article position tag that is appended or attached to image 402 or several such images that contain the article. The third input is an estimate of orientation 406 of the article to be confirmed as validly worn. Preferably, for more efficient processing by the system estimate of orientation 406 is in the form of an article orientation tag that is appended or attached to image 402 or several such images that contain the article. It should also be noted that tags can be attached to images containing the article, the segmented or extracted article or even the recognized article. The appropriate choice can be made by the system designer skilled in the art and given the performance requirements of the system and of the method.

Taken together, estimate of position 404 and estimate of orientation 406 represent an estimate of article pose. That is because pose is a technical term that means position and orientation. In cases where article pose information is desired, estimate of position 404 and estimate of orientation 406 can thus be merged and an article pose tag can be appended or attached to image 402 or several such images that contain the article. The pose tag can include a small subset of pose information, e.g., some position data and some orientation data or parameters all the way up to full article pose (complete orientation and position). In general, more pose information will permit a more robust validation that the article is indeed validly worn. However, the additional computational requirements impose by image processing, feature extraction and pose estimation to recover full pose should be balanced against a sufficiently reliable validation that the article is validly worn given the specific application.

The fourth input to image recognition module 400 is an estimate of proximity 408 of the article. Some manipulated user devices such as smart phones, pads or tablets have dedicated proximity measuring devices, e.g., time-of-flight or back-scatter light sensors. These devices can provide estimate of proximity 408 directly. Other manipulated user devices can estimate proximity of the article indirectly based on magnification, texture analysis, depth from defocus and still other techniques known to those skilled in the art. As in the case of estimates of position and orientation 404, 406 estimate of proximity 408 may be provided in the form of a tag attached to images containing the article, the segmented or extracted article or even the recognized article.

Image recognition module 400 recognizes the image of the article based on the inputs and sends it to spatial computation module 410, which determines whether the article is validly worn. The determination is based on estimating an anatomically valid spatial relationship between the recognized article and the user. More specifically, the determination is based on the pose of the manipulated device and the article. Further, this function can be performed with additional knowledge of associated body part and partial or full estimates of pose of associated body part with respect to the article. In fact, determination of whether the article is validly worn can be performed as in the method implemented in system 100 of FIGS. 1A-B described above.

Once the article is confirmed as validly worn by spatial computation module 410, the method is continued by classification module 412.

Classification module 412 receives four inputs. The first input is information about the recognized article 414. This information may include all the tags associated with the article and any additional information related to its state. Such additional information can include annotations added to the dataset associated with recognized article 414. This can include additional data about article 414 itself, such as customizations, artwork, patches, laces and accessories, or information about the state of article 414 itself, such as wear and tear. Additionally, annotations can be appended to the dataset from online sources or databases that associate a particular make and model of recognized article 414 with other data such as designer, manufacturer, endorser or any other data available about the history of the article or article design that could be useful for classification purposes.

The second input to classification module 412 is information about user profile and/or their history 416. The user profile typically includes data about user age, ethnicity, socioeconomic status, lifestyle, values, affiliations and other data relevant to classification. The user history typically includes previous purchases and choices.

The third input to classification module 412 is information about location 418. In the simplest case location 418 is simply the venue or environment in which the user is present at the time the article is confirmed as being validly worn. Such information can be provided in a general form, e.g., by a location sensing unit such as GPS on-board the user's manipulated user device. More detailed location 418, especially indoors, can be provided from optical data gathered by the camera or cameras on-board the user's manipulated device.

The fourth input to classification module 412 is information about the date and time 420. Date and time 420 information is particularly important for determining presence at venues associated with time-sensitive events such as concerts, performances, meetups, sales and the like.

Classification module 412 combines the four inputs to determine the type of content that is appropriate for the user. In the present case, classification module 412 assigns the user to groups and classifications 422 that are served as input to an assigner module 424 that is in charge of assigning content to the user.

Assigner module 424 uses groups and classifications 422 as well as additional inputs such as quest and content sets 426, offers and propositions 428 and social connections 430. Quest and content sets 426 are goals or missions in a game or a social experience where the user is given an objective to hunt for or find an object, solve a puzzle, or any other objective in a game mechanic, or to meet another person or group of people participating in the experience. Offers and propositions 428 can be promotions, advertisements, special limited edition offers that can only be accessed by users that are validly wearing a specific article.

It should be noted that quest and content sets 426 can include augmented reality (AR) experiences assigned to the user, or they can be virtual reality (VR), media or other content to be consumed online or offline.

An example is a music or video playlist by an artist of producer that is only accessible to the user confirmed to be validly wearing the article. Another example is a virtual good in a video game or virtual reality experience, where to have access to the virtual good or goods, such as a pair of sneakers with special powers in a video game, the user must be validly wearing a particular sneaker in real life. Still another example is a special offer for an article of merchandise or clothing that is only available to a user that is validly wearing a particular sneaker.

Social connections 430 can be obtained from a social graph that includes the user and their social connections. There are many known sources of social graphs, including social networks such as Facebook or LinkedIn.

Assigner module 424 makes the final selection of the content to be provided to the user. In the present example the manipulated user device is capable of presenting augmented reality (AR) experiences.

Hence, the personalized content provided to the user is a personalized AR experience content 432 that includes one or more virtual objects of promotional nature being displayed to the user on the display screen.

The method described with reference to FIG. 4 can be deployed in many specific settings. The system in which the method can be deployed can be system 100 of FIGS. 1A-B or still another system. The following examples present a few embodiments particularly advantageous embodiments with specific adaptations of the general apparatus and methods of invention.

Figure 5:
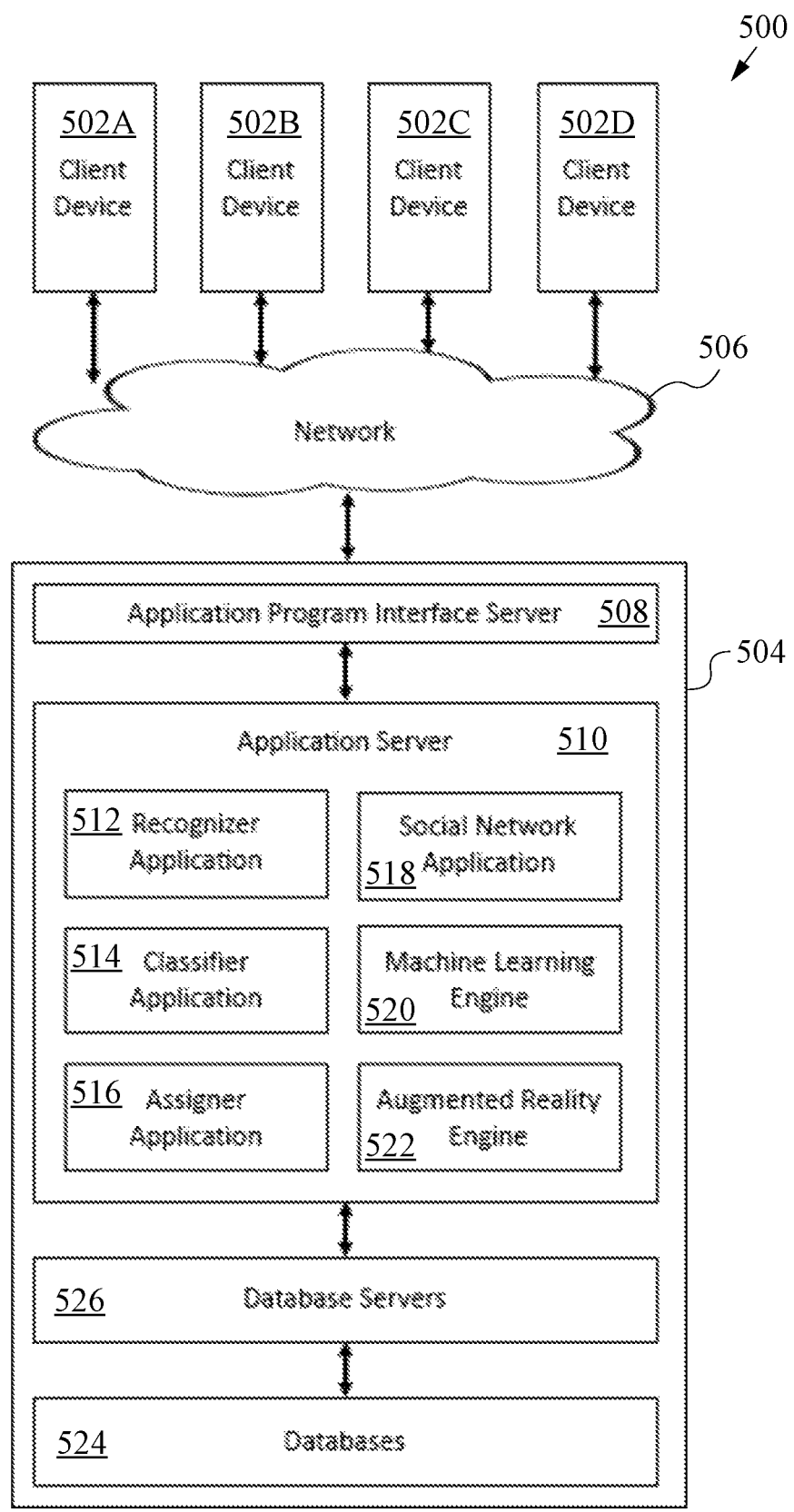
FIG. 5 is a diagram showing a system according to the invention for handing a number of user devices capable of serving augmented reality content.

FIG. 5 is a diagram showing a system 500 for handling a number of manipulated user devices here designated as client devices 502A-D. Client devices are smart phones, pads, tablets or still other user devices that are capable of serving augmented reality content. For example, client devices 502A-D are enabled by Apple's ARKit, Google's ARCore, Vuforia or still other on-board augmented reality platforms. These on-board AR platforms may further use improved pose recovery algorithms such as reduced homographies as described in U.S. Pat. No. 8,970,709 to Gonzalez-Banos et al.

Client devices 502A-D are in communication with a remote resource facility 504, e.g., a cloud facility or a remote server facility via a network 506. Preferably, network 506 is capable of providing rapid and low-latency connectivity to support seamless AR experiences.

Facility 504 interacts with client devices 502A-D through an application program interface (API) server 508 that connects to an application server 510. Application server 510 has the resources required to implement the method of invention when provided by image, position, orientation and other relevant data from client devices 502A-D. For example, the data provided from client devices 502A-D includes images of the article being worn, as well as estimates of position and/or estimates of orientation for each client device 502A-D and for the article being worn. In addition, estimates of position and/or estimates of orientation of the user's body part associated with the worn article or on which the article is worn can also be provided by each client device 502A-D.

Application server 510 has a recognizer application 512 that combines the functions of image recognition and spatial computation modules, such as, e.g., modules 400 and 410 in the embodiment described above in relation to FIG. 4. In other words, recognizer application 512 confirms whether the article is being validly worn by the users of corresponding client devices 502A-D.

Application server 510 has a classifier application 514 that performs the functions of a classification module, e.g., module 412 in the in the embodiment described above in relation to FIG. 4. Further, application server 510 has an assigner application 516 that performs the functions of an assigner module, e.g., module 424 in the in the embodiment described above in relation to FIG. 4. Application server 510 also has a social network application 518 that tracks the users of client devices 502A-D in their social contexts. This can be done based on a social graph or any other suitable data structure. Finally, application server 510 has a machine learning engine 520 and an augmented reality engine 522.

Both recognizer application 512 and classifier application 514 can use machine learning engine 520 as the recognition, classification, and assignment process is trained over large amounts of user data and user responses collected over network 506. For example, recognizer application 512 may ask for user confirmation or correction of the identification of the article which can serve to train an improve the image recognition through well-known machine learning classification and training techniques. Classification application 514 may train its recommendations based on user confirmation of whether the experience was beneficial, or passive monitoring of whether the user took advantage of offers, quests or content assigned to the user. Thus, machine learning can improve the classification of users and articles into groups, and also can by the same method improve future assignments.

By using recognizer application 512, classifier application 514, assignor application 516 and social network application 518 application server 510 determines the appropriate augmented reality content to be served to each user whose article is confirmed to be validly worn. Any necessary data for applications 512, 514, 516 and 518 to perform their assignments is provided from databases 524 via corresponding database servers 526. Meanwhile, machine learning engine 520 operates on directly requested user response data such as confirmation or correction, solicited user feedback about the appropriateness of assigned content, and passive monitoring of the user's engagement with assigned content. The initial machine learning can also be trained by a user group specifically recruited to provide corrections and responses. Finally, augmented reality engine 522 sends the designated AR content to the users of client devices 502A-D that have been confirmed to be validly wearing their article(s).

FIGS. 6A-E illustrate an embodiment in which simple pose parameters including partial orientation and/or position as well as proximity are used to determine when an article is properly worn by the user. This embodiment can be implemented within any of the systems and methods described above. Rather than being very robust, as may be required when the content made available to the user is of very high value or requires privacy, this embodiment is ideal for situation where low to intermediate level confidence that the article is validly worn is sufficient. Such levels of confidence are common in standard commerce and at low-security events.

Figure 6A:
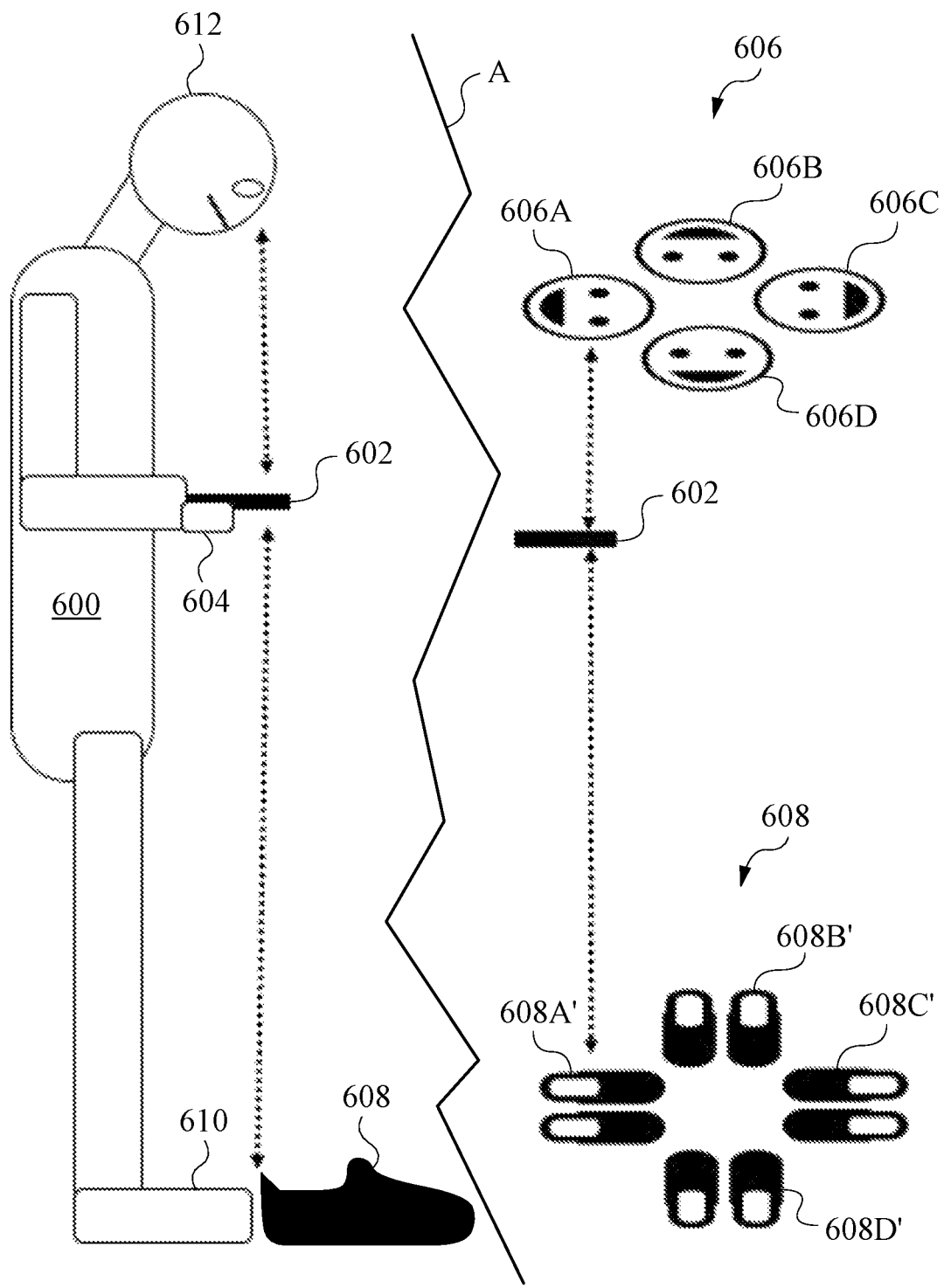

FIG. 6A shows a user 600 holding a manipulated user device 602 in their hand 604 on the left of separator line A. On the right of separator line A, FIG. 6A shows two types of possible fiducials 606, 608' that are deployed by a user guidance module. Fiducials 606, 608' are designed to instruct user 600 about a relative placement or presentation of a worn article 608, in this example a pair of shoes that are to be confirmed as being validly worn by user 600 on their feet 610. Fiducials 608' representing pair of shoes 608 are shown in four possible orientations with respect to feet 610 of user 600. In particular, four images of shoes 608' in four basic orientations 608A'-D' can be shown in the form of fiducials to user 600. Images of shoes 608' can either be those of actual shoes 608 or generic shoe images that aid user 600 in relative placement or presentation.

In a first type of verification, only a general orientation of shoes 608 with respect to head 612 while being worn on feet 610 of user 600 is relied upon for validation. Consequently, fiducials 606 include four images 606A-D indicating four orientations of head 612 of user 600 with respect to shoes 608. One or more of shoe images 608A'-D' can also be displayed to user 600 by user guidance module on the screen of user device 602.

Figure 6B:
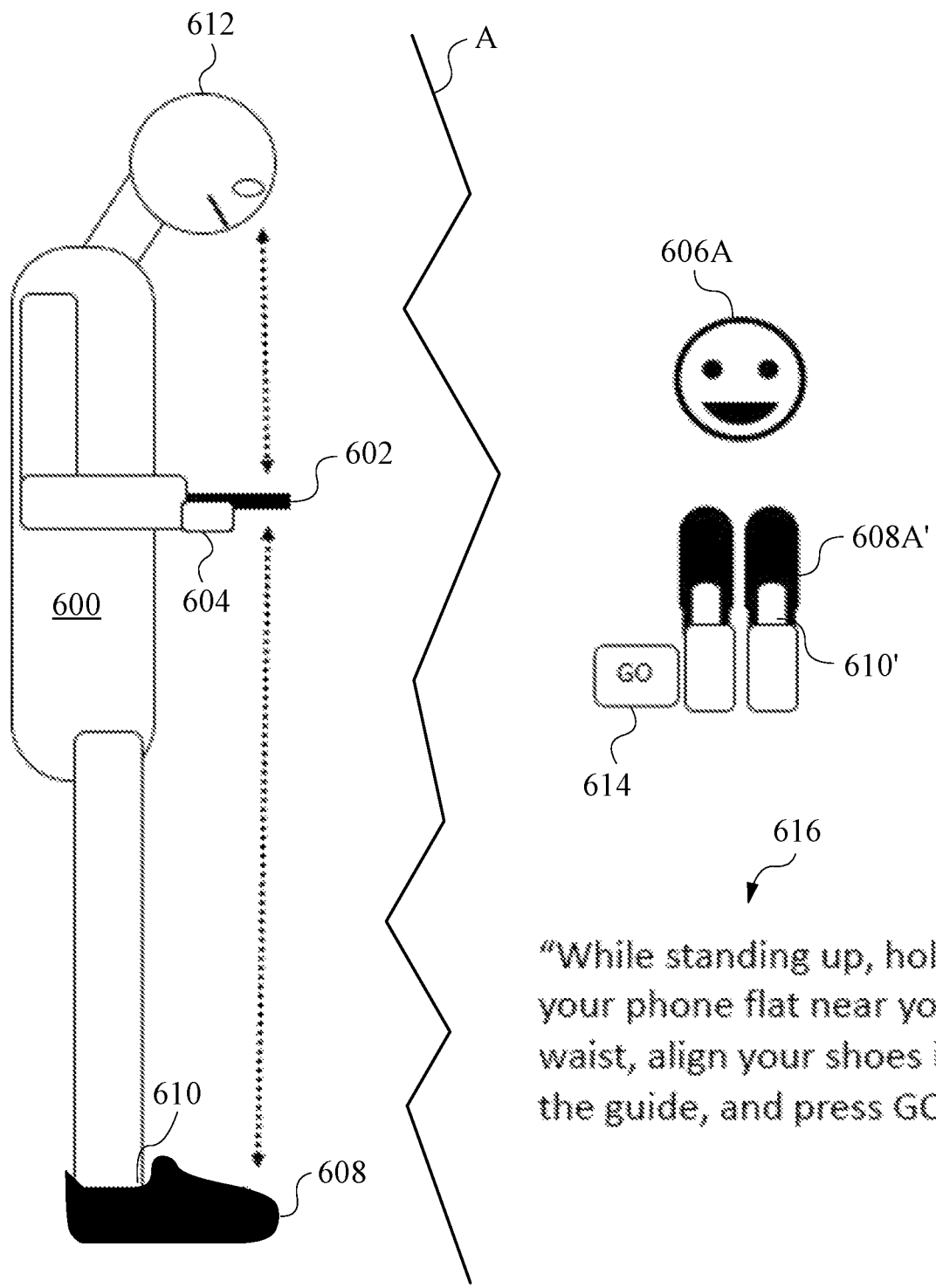

FIG. 6B shows the actual instructions shown to user 600 during the orientation-based validation process. In FIG. 6B user 600 is wearing actual pair of shoes 608 on their feet 610. This is shown to the left of separator line A. To the right of separator line A are illustrated the instructions to user 600 appearing on the display screen of manipulated user device 602. The instructions include fiducial 606A showing the correct orientation of head 612. Below is an image of user's feet 610' and fiducials 608A' showing the correct orientation of shoes 608 required for validation that they are being validly worn. For additional user guidance, user guidance module also displays a "GO" button 614 and textual instructions 616 to aid user 600 in completing the validation process.

FIG. 6C illustrates a case in which shoes 608 will not be confirmed as being validly worn by user 600. Specifically, when the correct image 608A' is not matched by the actual orientation of shoes 608 with respect of head 612 the validation will fail. In this situation guidance module may display fiducial 608C' and 606A to visually indicate to user 600 why the validation failed and to permit user 600 to try again.

FIG. 6D illustrates another case in which shoes 608 will not be confirmed as being validly worn by user 600. Here, the correct image 606A of orientation of head 612 with respect to shoes 608 does not match. In other words, the actual orientation of shoes 608 with respect to head 612 leads to failure in confirmation of validly worn shoes 608. In this situation guidance module may display fiducial 606D and 608A' to visually indicate to user 600 why the validation failed and to permit user 600 to try again.

Figure 6E:
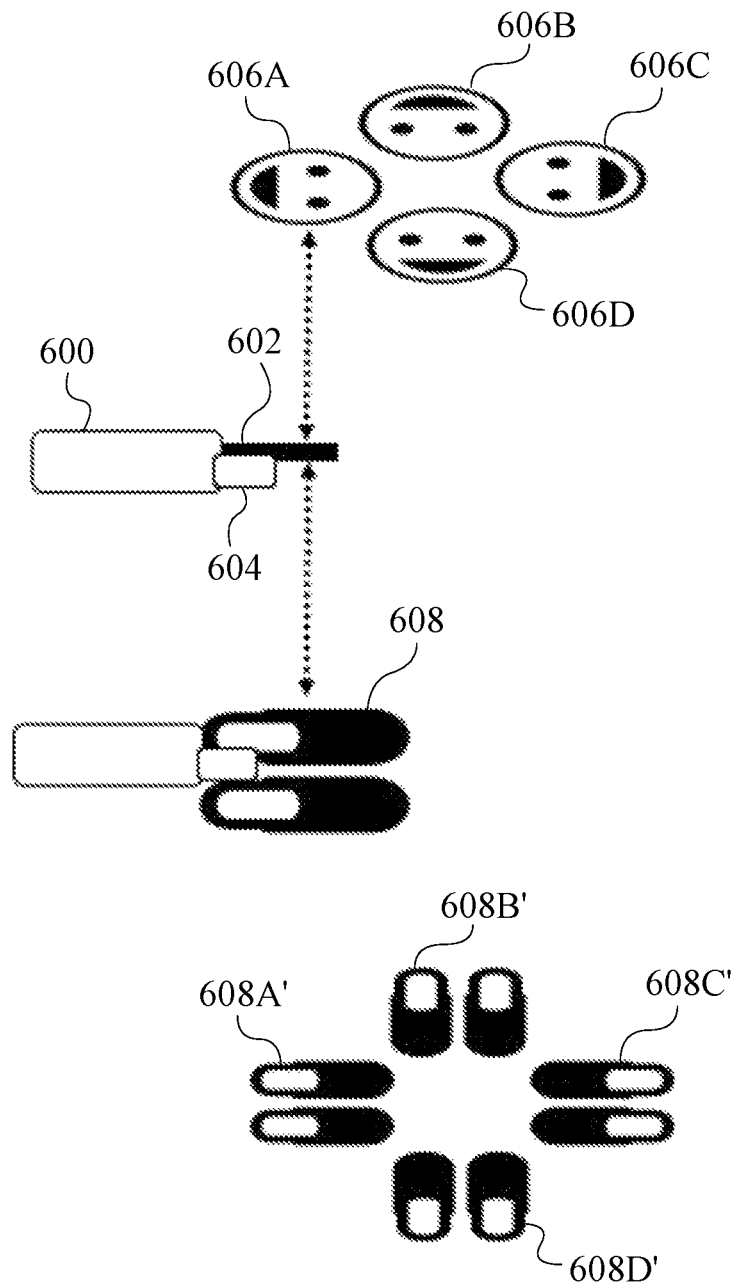

FIG. 6E illustrates another case in which shoes 608 will not be confirmed as being validly worn by user 600. In this example the failure is not due to orientation but proximity of shoes 608 to manipulated user device 602. In fact, here user 600 is holding shoes 608 in their other hand rather than wearing them on their feet. Guidance module may instruct user 600 to put on shoes 608 by using appropriate text on the screen of manipulated user device 602 in this situation.

In some embodiments the context in which a user is validly wearing an item is of great importance. In general, context includes the environment and the time when the user is present in the environment.

Presence at a particular location in the environment at a certain time while validly wearing the article can also be of further value in personalizing content.

FIG. 7A illustrates a contextual application of the invention. In this case an environment 700 is a museum with an art installation 702. Art installation 702 is only displayed during a certain time period and it is composed of many individual art pieces 702A-D. A number of users 704A-F are present at museum 700 during a showing of art installation 702.

Each one of art pieces 702A-D is identified by a code which may simply be a bar code or a more advanced Quick Response (QR) code. In the present embodiment art pieces 702A-D are uniquely identified by corresponding QR codes 703A-D. Furthermore, each one of art pieces 702A-D has a corresponding proximity detector 705A-D for detecting the presence of a person and generating a trigger signal or trigger event.

Similarly, QR codes 703A-D can also generate trigger event or events when detected by a user's manipulated device.

FIG. 7B shows an interaction between three specific users 704A-C and art piece 702A. Users 704A-C have their corresponding manipulated user devices 706A-C capable of detecting trigger signals from proximity detector 705A. Proximity detector 705A provides a trigger signal when user 704A is sufficiently close to art piece 702A to receive user-specific content on user device 706A. At this point user 704A can perform the actions described above to confirm that they are validly wearing a given article. User 704A can then point user device 706A at art piece 702A to read QR code 703A and release assigned content 708A.

In the present example assigned content 708A is a particular brand of sneaker shown to the user on the screen of their user device 706A.

Thus, QR code 703A and proximity detector 705A serve the function of determining location or georeferencing of location. This provides an important input for selecting assigned content, quests and offers that may be associated with a particular experience. In the present case, an offer for a particular brand of sneakers may be associated with the user experience directly near or associated with art piece 702A or any other art piece of art installation 702 featuring that particular brand. It should be noted that assigned content, quests and offers may be associated with particular locations broadly, such as at the level of city data, or very specifically, for very specific locations within an installation such as, e.g., art installation 702, or in a retail setting. In general, QR codes and beacons that detect proximity to a specific object can also serve to provide a finer tuned location that might not be detectable from GPS data, particularly indoors.

It is further desirable to tune the experiences unlocked by users that are validly wearing an article based on additional attributes of the article. FIG. 8A illustrates a user 800 who was previously confirmed to be validly wearing a sneaker 802 in accordance with the invention.

Three versions of sneaker 802 are shown in sneaker customization bar 804 on the display of user device. Specifically, versions 802A, 802B, 802C of sneaker 802 have different customization attributes. In the present example, customization attributes are in the form of stencils that can be applied on the topside of sneaker 802. Further, in the present example, the stencils are produced by a known designer 806. A full list of customization attributes in the form of stencils and patches from designer 806 as known to the system are shown in repository 808 of stencils and patches. Conveniently, repository 808 can be stored in the system's database (not shown).

The content delivered to user 800 can be further tuned by stencil that is present on their sneaker. Here, the application has already narrowed down the choices of possible stencils present in repository 808 to the ones shown on sneaker customization bar 804. Specifically, user 800 can confirm which stencil their sneaker bears by selecting version 802A, 802B or 802C of sneaker 802. Of course, in some embodiments the confirmation of sneaker version based on its stencil may be performed optically with the aid of the camera present on-board the user device. This step can even be integrated with the method of invention to confirm that the sneaker is validly worn by user 800.

In some cases, the presence of a customization attribute such as a stencil, a patch, a tag, a mark, artwork and/or other addition or modification of the article confirmed to be validly worn can serve to further verify that the specific type of article is authentic, or belongs to a group of authentic articles. These may be endorsed, verified, certified or in any other way attested articles. The attesting agent can be a designer, an artist, a personage, a celebrity or any other attesting agent. For example, the attestation may confirm that the attesting agent owns a similar article or has endorsed such article or a similar article. Thus, further verification based on customization attributes can unleash more targeted or tuned content to the user. The customization attributes can in some embodiments be treated as metadata by the system. In particular, they can be stored along with recognized articles in any database belonging to the system.

FIG. 8B illustrates the step of unleashing specialized augmented reality content in the example of museum 700 with art installation 702 as shown in FIG. 7A. Users 704A-C are not shown here, but their respective user devices 706A-C are shown next to sneakers 710A-C that are already recognized as being validly worn by the users, respectively. Each user is next to art piece 702A and in range to receive unlocked content related to art piece 702A. The application tunes the actual content related to art piece 702A released to the users to the customization attributes 712A-C associated with their sneakers.

Art installation 702 and specifically art piece 702A is enhanced through augmented reality display of content on user's mobile device 706A-C when the user views art piece 702A through the display and camera of their device 706A-C. Here, the augmented content depends on what sneakers the user is wearing and what customization attribute is borne by their sneaker. A user wearing Nike Air Jordans for example will see a special augmented content personalized to users within that class of users, where a user wearing Adidas All Stars will see different augmented content. This technique can be used to motivate users to purchase and wear particular articles such as sneakers or streetwear, and to reward particular users with enhanced experiences.

FIG. 9 illustrates a user 900 with user device 902 embodied by a mobile pad or tablet. User 900 is already confirmed to be validly wearing an article by Nike. User 900 is thus provided with augmented content that illustrates a location 904, in the present case an Apple computer store, where user 900 will receive special offers on Apple products as a result of validly wearing the Nike article. The offer can be provided to user 900 in the form of an augmented reality overlay on location 904 when user 900 points their pad 902 at location 904.

FIG. 10A illustrates a situation where many users 1000 are using the augmented reality system in the same location 1002. Users D, E and F are confirmed to be validly wearing their articles. Furthermore, users D-F are determined to be members of the same classification by virtue of wearing the same type or brand of article, e.g., a sneaker. Of course, the system's classification module may use additional criteria to group users D-F, such as their purchase history.

Users G, H and I are also confirmed to be validly wearing their articles. Furthermore, users G-I are determined to be members of the same classification by virtue of wearing the same type or brand of article, e.g., a dress shoe. Of course, the system's classification module may use additional criteria to group users G-I, such as their purchase history or social affiliation.

FIG. 10B focuses of group of users D-F to illustrate how the same classification can be used to form a social network 1004 by introducing users D-F to each other either on-line or using augmented reality at the location. It should be noted that users D-F have different customization attributes and thus may be segmented into different classes. This offers an alternative manner of forming social network 1004 based on a game question that requires each one of users D-F to find other users D-F in a different class in order to complete a set and accomplish a mission. The system therefore motivates new social connection and interaction that may lead to ephemeral or sustained new social matches. Ephemeral matches can be especially valuable to promote common social objective or teamwork in games that can be served to users on their devices.

The content made available or provided to the user upon determination that the article is validly worn can range from content that is consumable directly on the manipulated user device, on another device or in physical form. Although exemplary content includes items such as music, videos, games, virtual content or item, augmented content of item, coupons (virtual or physical), promotions, special offers and the like other content can be made available in the context of the invention. However, whatever content is chosen, its release depends on the recognized article being validly worn. Many types of articles qualify as worn. Most common ones include articles of clothing such as sneakers, shoes, hats, and still other wearable items. However, jewelry, adornments, ornaments and still other accoutrements also qualify as worn articles in the sense of the invention.

Content accessed from a content playing application is unlocked when user authenticates that user is wearing an article that is a member of a set of articles associated with a store of content. Member of a set can include, for example, a specific brand of article, or a specific article such as a new release of a sneaker. Content accessed upon authentication of the user worn article can be content usable or presentable in an application including a music player, video player, social network, shopping application, gaming application, our tour-guide application. Content accessed upon authentication of the user worn article also can be virtual goods traded in a marketplace or used in a video game, social network or virtual environment. Such virtual goods may be cryptographically secured and recorded in a blockchain.

As an example, an artist Kanye West releases a new Yeezy sneaker with an offer that users may unlock and play a playlist of Kanye West songs while wearing the specified sneaker. Another example is that an audio tour of an art museum narrated by Kanye West can be unlocked while wearing Yeezy sneakers to the museum at a specified location. Another example is a video game in which the game character has special powers or is wearing a specified article in the game world only after the user authenticates that the user is wearing a specified article or member of a set of articles in the physical world.

The application can specify an acceptable confidence level required to unlock the content associated with the authenticated user-worn article. Using sneakers as an example, there are levels of classification: Manufacturer such as Nike or Adidas, brand such as Nike Air Jordan or Adidas Yeezy, and series within the brand, such as Air Jordan 1 or Air Jordan 3, or Yeezy 350 or Yeezy 700. Within the series, there are a lot of variations of specific designs, some of which are associated with artists or athletes. For example, the Nike Air Jordan 1 collaboration with musician Travis Scott to produce the Air Jordan 1 Retro High OG "Mocha".

Recognition of a brand may include membership in one of a set of articles, or can be based on recognition of specific features such as a logo, or a combination. Recognition of a model within the brand is more generally based on the shape and a combination of edges. Recognition of the specific designs typically is based on colors and other superficial features rather than the shape itself.

Content may be unlocked or assigned based on brand, model, series, colors or designs that are collaborations with specific athletes or artists. Large labeled databases of sneakers already exist which be used for pattern recognition using well known machine learning techniques. These databases can be further trained by the image capture and labeling of images produced by the recognition and authentication application.

In another embodiment, the authentication of articles worn by the user of the system and method may be cumulated to authenticate possession of a collection of items by a user. Such authentication is particularly useful for users who buy, sell or trade limited edition articles such as sneakers, streetwear and accessories. With the increase in peer-to-peer and consumer resale marketplaces such as eBay, Etsy, StockX, GOAT and other, challenges to building trust in the transaction include authentication of the item for sale or trade and authentication that the seller or trader is in possession of the item. By using the authentication method of the invention, additional authentication data can be added to the record of the item for sale or trade and to transaction record verifying and documenting that the item was in fact validly in possession of the user at a date, time and location. This transaction record also may be used to validate a collection of items for a single user or group of users for the purposes of presenting league tables, the value of collections, or competition between users or groups of users in addition to facilitating trust in a marketplace for buying, selling or trading such items. The validation and transaction records also can be cryptographically secured in a blockchain. Promotions, competitions and markets using the validation method may be for a collection of items from a user or group of users, or also may be a collection of locations or contexts for single or subset of items. For example, a promotion or competition could authenticate that a user wore a particular brand of sneakers to a retail outlet, concert venue or event in a series of locations.

Another set of embodiments of the invention provide for identifying an article presented by a user in a certain environment and releasing specific or assigned content to that user upon additional verification. The additional verification centers the article being presented and, more precisely still, its rightful ownership or rights. This is important especially in situations where many copies of the article may exist, but only one user actually and verifiably owns the article. This additional condition that the article is verifiably owned by or in possession of the user is another gating factor or condition for release of assigned content. In other words, the condition for releasing assigned content to the user is two pronged: 1) the article has to be validly presented by the user and 2) the article has to be verifiably owned by or in possession of the user, meaning that the user has possesses the associated rights, whether by explicit ownership or possession of a valid license.

FIGS. 11A-B illustrate a particular example of such an embodiment of a system 1100 for a user 1102 in two separate and distinct environments. FIG. 11A shows user 1102 in an environment 1106A that is inside a store or in-store. Store 1106A can be a store that specializes in the sale of experiential or virtual goods.

User 1102 has a manipulated user device 1104 equipped with a camera 1108. A field of view 1110 of camera 1108 is indicated in dashed lines. In the present case, user device 1104 is a smart phone and camera 1108 is the front facing camera belonging to the smart phone. Field of view 1110 is oriented away from user 1102. Of course, user 1102 can manipulate smart phone 1104 such that field of view 1110 of camera 1108 can capture different parts of user 1102 and of environment 1106A.

Store 1106A is set up to provide previews of experiential content including augmented and virtual reality content on offer. For that purpose, store has on display articles that trigger access to content that is not owned by or licensed to user 1102. A specific article 1112 designed to be presented by user 1102 for purposes of being granted access to such preview is a large-scale card 1112. Of course, article 1112 can also be any of the types of articles already discussed above, but in the present context a change of article is convenient since it is only to be shown in the in-store settings. Exemplary content for preview can be a music item, a video item, an image, a 3D model, a game item, a video game content, a virtual content, an augmented content, a coupon, a promotion or a special offer.

Card 1112 can be a floor sign or a card positioned on a counter. In the present case card 1112 is placed on the floor of store 1106A and is further provided with an augmented reality (AR) anchor 1114. AR anchor 1114 is a visual pattern or code. Conveniently, AR anchor 1114 can be a quick recognition (QR) code imprinted or otherwise affixed to card 1112. In the present example, QR code 1114 is provided in aesthetic relief form on the top-facing side of floor sign 1112.

Smart phone 1104 has a display screen 1116 which is also shown in an enlarged view connected by dashed and dotted lines such that items in field of view 1110 of front camera 1108 are clearly visible. Specifically, user 1102 is holding smart phone 1104 in such a way that card 1112 with AR anchor 1114 is in field of view 1110 and is thus imaged by front camera 1108 and displayed on screen 1116. More precisely, an image 1112' of card 1112 that user 1102 is presenting to front camera 1108 is displayed on screen 1116. In order to distinguish an image from the object itself the reference numeral corresponding to the image is denoted with a prime (').

The remainder of system 1100 is analogous to that of system 100 described above in reference to FIGS. 1A-B. That part of system 100 will be described as it applies within system 1100 while retaining the reference numbers from FIGS. 1A-B for clarity. Specifically, coordinate system 107 is used to describe positions and orientations in environment 1106A. Although any type of coordinate systems and/or conventions can be used, the present embodiment employs Cartesian coordinates in system 107 for clarity and ease of explanation. Cartesian system 107 has three mutually perpendicular axes $X_w$, $Y_w$, $Z_w$. The subscripts "w" are used to denote that coordinate system 107 represents world coordinates that parameterize in-store environment 1106A.

FIG. 11B is a schematic view and diagram illustrating in more detail several aspects of system 1100 shown in FIG. 11A, but with user 1102 in a different environment 1106B. Environment 1106B is not in-store. More precisely, environment 1106B can be any indoor or outdoor environment where the content or virtual goods user 1102 was able to preview in-store 1106A are no longer available for preview. That content can only be enjoyed in environment 1106B by user 1102 if he or she owns access to the content via ownership of or license to article 1112 or another article that is designed to give user 1102 access to the content.

In order to permit access to user 1102 to content the on-board computational resources have to be adjusted. As before, resources 124 include a central processing unit (CPU) 126, a digital signal processor (DSP) 128, an image capture unit 130, a pose estimation module 132, a location sensing unit 134 and a wireless network transceiver 136. A bus 138 interconnects CPU 126, DSP 128, image capture unit 130, pose estimation module 132, location sensing unit 134 and transceiver 136 such that all of these resources can communicate and cooperate with each other. Further, resources 124 also include a memory unit 140 connected to bus 138.

Memory unit 140 has several specific modules used by system 1100. These specific modules include a rights verification module 1142, an image processing and feature extraction module 144, an assigner module 146 and a classification module 148. A local data store 150 is also among on-board computational resources 124. Data store 150 is connected to bus 138 such that it can communicate with any other computational resources 124 on-board smart phone 1104.

Device coordinates 105 are Cartesian and have mutually perpendicular axes $X_d, Y_d, Z_d$ where the subscript "d" stands for device. The origin of device coordinates 105 is taken at a center point 152 of smart phone 1104. Changes in pose describe all the possible movements that smart phone 1104 can experience by being either moved linearly and/or rotated about any arbitrary axis by user 1102. The pose of smartphone 1104 is recovered with the aid of resources 124 in the manner already described above.

As in the prior embodiments, a module such as user guidance module 154 can provide information on proper presentation of article 1112 when in either environment 1106A or 1106B. It should be noted that although article 1112 or a copy thereof could be procured by user 1102 at store 1106A to have access to the content it is more convenient to issue another article 1113 to user 1102. Article 1113 in the present example is a hand-held card that is that is validly owned by, licensed to, or in possession of user 1102 and is assigned to the specific content, here referred to as assigned content.

To access assigned content, user guidance module 154 can display a fiducial feature or an alignment aid 156 to user 1102 on display screen 1106 of smart phone 1104. However, given the lower pose alignment tolerance required in these embodiments, some simple information can suffice without any alignment and/or positioning aids. In other words, general information about proximity, i.e., keeping card 1113 close to camera 1108, and about orientation of card 1113 can be sufficient to advise user 1102 of proper presentation of card 1113. As before, proper presentation includes appropriate presentation to permit good imaging, positioning, lighting and other considerations already discussed above. For completeness, the axes $X_a, Y_a, Z_a$ of article coordinates 160 are designated with subscript "a" to denote article 1113.

In the present embodiment, since user 1102 can be presumed to be presenting article 1113 that they duly own, a casual or low-level verification of proper pose can be sufficient. For example, it may be sufficient to recover only a partial and/or relative pose of card 1113 with respect to smart phone 1104. For example, relative distance or proximity of card 1113 to phone 1104 with a generally phone-facing orientation of card 1113 can be sufficient.

Returning to FIG. 11A, it is seen that system 1100 also has a remote part located in a remote server or facility 162. In other words, system 1100 is a distributed system with remote resources. Communications between smart phone 1104 and facility 162 are supported by a network 164. Suitable uplink signals 166 and downlink signals 168 are used to transmit the requisite information between smart phone 1104 and facility 162 via network 164 to operate system 1100 as described in more detail below.

Remote facility 162 has an application program interface server 170 (API server) that manages the overall coordination between smart phone 1104 and resources necessary to practice the method. The actual remote part of the application resides on an application server 172.

Application server 172 has an image recognition module 174, which can either cooperate with image processing and feature extraction module 144 (see FIG. 11B) on-board smart phone 104 to provide the requisite image recognition capabilities or provide all the requisite image recognition capabilities by itself. Alternatively, as described above, the function of image recognition can be entirely performed by image processing and feature extraction module 144 on-board smart phone 1104 rather than remote from it. A person skilled in the art will appreciate that image recognition can be a computationally challenging task and that in some cases performing it entirely remotely by image recognition module 174 will be the most efficient way for ensuring reliable operation of system 1100.

Application server 172 also has a spatial computation module 176 that obtains information from image recognition module 174 and from pose estimation module 132 (see FIG. 11B). Spatial computation module 176 is further in communication with one or more data bases 178 via database servers 180. Data bases 178 provide necessary article-related and spatial information to enable spatial computation module 176 to estimate whether article 1113 is being properly presented. In order to enable recognition, data bases 178 contain reference images of possible articles that user 1102 could own. In the present example, data bases 178 contain reference images of all possible placards, cards, wearables and other items that user 1102 could own and use to gain access to assigned content.

An exemplary method of operating system 1100 will now be described in reference to FIGS. 11A-B. It should be noted that system 1100 can support many modes of operation and can be adapted to many types of environments, articles and users. Furthermore, as already indicated above, the capabilities of the various on-board and remote resources can be re-configured, partitioned or entirely delegated to a single on-board or remote module depending on the application, as will be apparent to one skilled in the art.

To start, while at store 1106A, user 1102 properly presents article 1112 to camera 1108 of smart phone 1104. Smart phone 1104 uses its on-board resources 124 to recognize article 1112 and estimate its pose.

This is done in order to confirm that article 1112 is being properly presented by user 1102.

Specifically, smart phone 1104 first uses its pose estimation module 132 to estimate its own pose. In most manipulated user devices including smart phone 1104 pose estimation module 132 relies on at least one camera, here camera 1108, and any other camera available (e.g., a back-facing camera) and at least one camera image taken by camera 1108 as well as any other data available from other cameras and/or auxiliary sensors. As already mentioned above, suitable auxiliary sensors include inertial units (gyros and/or accelerometers), magnetic units, acoustic units and/or still other relative or absolute position and motion sensing units. In many instances the data from the image taken by camera 1108 and from any auxiliary sensor(s) is fused to estimate the pose of the smart phone 1104.

System 1100 then uses image recognition module 174 that may be on-board smart phone 1104 or, as in the present example, in remote server or facility 162. Image recognition module 174 is in communication with camera 1108 so that it can use its camera images to recognize therein article 1112 presented by user 1102. More specifically, image recognition module 174 recognizes article 1112 from a best match with one or more reference images of articles in its databases 178 and provides an article pose estimate to at least one camera image that contains article 1112. Recognition of article 1112 can involve attaching an article label to one or more images in which an image 1112' of article 1112 is found. Once labelled through the best match, article 1112 is treated by system 1100 as a recognized article 1112".

Proper presentation of article 1112 by user 1102 may include attributes that include proper positioning in the field of view of camera 1108 that is taking the image or images, proper lighting, proper line-of-sight (reduced occlusion) and/or any other attributes that ensure that the article can be processed by system 1100 to become recognized article 1112". In the present embodiment, the presentation is not as rigid as in some other high-precision applications mentioned above. Hence, general proximity and orientation of article 1112 with respect to camera 1108 are typically sufficient. This is further facilitated by the AR anchor represented by QR code 1114 borne by article 1112.

Obtaining the article pose estimate can involve attaching an article pose tag to one or more images in which an article image 1112' is found.

Such pose tag attached to article 1112 or recognized article 1112" provides information related to the pose of article 1112 in the camera image where it was recognized. The pose tag may include a small subset of pose information, e.g., just a general article orientation data, general article position data, any combination of orientation and position data or parameters all the way up to the full article pose (complete orientation and position). Again, in the lower precision situation here, general proximity and orientation are typically sufficient.

Next, system 1100 uses spatial computation module 176 that is in communication with image recognition module 174 as well as with pose estimation module 132. From the data obtained, spatial computation module 176 estimates whether a valid spatial relationship or valid presentation of article 1112 exists between recognized article 1112" and user 1102. More precisely, based on the pose of smart phone 1104 held by user 1102 and article pose estimate that provides some data about the pose of article 1112, spatial computation module 176 determines whether user 1102 is properly presenting recognized article 1112". The value of such estimate of a valid spatial relationship is used to validate, e.g., by using a threshold or other statistical approach, that recognized article 1112" is validly presented by user 1102.

The finding of proper presentation is explicitly reflected in FIG. 11A in spatial computation module 176. This finding represents the first prong of the two-pronged test or condition for release of assigned content to user 1102.

In checking the second prong of the condition system 1100 uses rights verification module 1142 (see FIG. 11B). Rights verification module 1142 is in communication with image recognition module 174. In the present case this occurs via network 164, since communications between smart phone 1104 and facility 162 are supported by network 164.

Suitable uplink signals 166 and downlink signals 168 are used to transmit the requisite information between smart phone 1104 and facility 162 via network 164 to operate system 1100 and to enable communication between rights verification module 1142 and image recognition module 174 in particular.

Rights verification module 1142 works with recognized article 1112" as recognized by image recognition module 174. Specifically, rights verification module 1142 looks up a token 1143 associated with article 1112 that is recognized. Token 1143 is preferably stored on a blockchain (not shown). Token 1143 is used to determine whether article 1112 is verifiably owned by or licensed to user 1102 that has presented it. It should be noted that although rights verification module 1142 is present on-board smart phone 1104, it may be desirable, e.g., for security reasons, to place module 1142 within facility 162 in some embodiments.

At this point system 1100 checks to establish that the two-pronged condition is satisfied. Namely, that article 1112 is validly or properly presented by user 1102 and also that article 1112 is verifiably owned by or licensed to user 1102. Upon establishment of the condition smart phone 1104 releases or displays the assigned content on its display screen 1116. As already stated above, assigned content can take on various forms such as a music item, a video item, a game item, a video game content, a virtual content, an augmented content, a coupon, a promotion or a special offer. When user device 1104 is an augmented reality device the assigned content can include a virtual object that is displayed to user 1102.

In a preferred embodiment, assigned content is only made available to user 1102 in an out-of-store environment such as environment 1106B when the two-pronged condition is met. However, user device 1104 can nevertheless display assigned content when user 1102 is in a prescribed location even before user 1102 has purchased or licensed the rights to view the assigned content to thus satisfy the two-pronged condition.

First and foremost, user 1102 may view the assigned content when inside the geofence of a store, e.g., within in-store environment 1106A.

Alternatively or in addition, user 1102 may view the assigned content at some other prescribed location such as a museum or other venue, or in the presence of a beacon located at such a venue. Some articles they may be available only in certain environments or settings including at certain performances, at agree-upon social venues and at still other designated or specific environments, possibly at prescribed times.

However, user 1102 may only view the assigned content outside of store 1106A or beyond the prescribed location or before/after allocated times after user 1102 has acquired the rights to do so and thus the two-pronged condition is satisfied.

User 1102 may acquire these rights by purchasing article 1112 bundled with token 1143 representing the assigned content. After the user has acquired such rights, then the user may view the assigned content outside of the prescribed location. This is particularly important to enable a retailer to sell digital content on location at the store 1106A, while also allowing user 1102 and other potential users to view a larger inventory of digital content at retail store or in-store 1106A.

User 1102 can purchase the rights to view only a desired selection of assigned content within environment 1106B which may be at home.

In some embodiments user device 1104 can display non-assigned content to user 1102 prior to establishing the two-pronged condition for releasing the assigned content. The non-assigned content can include general information about what the assigned content is about. Further, the non-assigned content may present hints or information about the manner in which article 1112 should be presented to make sure it is duly recognized. For example, the information may include pointers about acceptable position, orientation and proximity (distance away) of article 1112 from the camera on-board user device 1104. In some cases, the information can instruct user 1102 about the presentation pose and proper placement or location in field of view 1110 of camera 1108. These functions may be implemented with the aid of user guidance module 154.

Again, many types of articles qualify for the purposes of the present invention. Most common ones include articles of clothing such as sneakers, shoes, hats, and still other wearable items that user 1102 is apt to have with them. Jewelry, adornments, ornaments and still other accoutrements also qualify as suitable articles. More generally, manipulatable items such as cards or objects that can be appropriately moved and presented by the user in their hand to the camera of the user device also satisfy the condition.

In a preferred embodiment token 1143 is a non-fungible token (NFT) NFT 1143 can be stored on user device 1104. Alternatively, NFT 1143 can be located in the user's account or in his or her digital wallet.

In either case, rights verification module 1142 finds and accesses NFT 1143 to confirm and authenticate cryptographically on the blockchain the user's rights related to the article or digital content associated with the article based on NFT 1143.

In many practical applications user 1102 is active in a marketplace.

User 1102 can transact in the marketplace and use token 1143 in such transactions. The transactions extend to all possible trades and outright sales. In any case, the transactions are recorded on the blockchain to track the user's rights status. When the user engages in a sale transaction and sells their token 1143, then system 1100 recognizes this event when the sale is recorded on the blockchain. In particular, when rights verification module 1142 finds the sale recorded on the blockchain it ensures that user 1102 loses access to the assigned content.

It will be evident to a person skilled in the art that the present invention admits of various other embodiments. Therefore, its scope should be judged by the claims and their legal equivalents.

The invention claimed is:

1. A system comprising:
   (a) a user device held by a user and equipped with a camera;
   (b) an image recognition module for identifying an article to obtain a recognized article, and for estimating a pose of said user device;
   (c) a spatial computation module for validating a spatial relationship between said recognized article and said user based on a pose of said user device and on a pose of said recognized article and for validating an association of said user with said recognized article, wherein said pose of said user device and said pose of said recognized article consist of up to six degrees of freedoms of said user device and said recognized article respectively; and
   (d) a module for presenting an assigned content of said article to said user upon verifying access rights of said user to said assigned content.

2. The system of claim 1, wherein said assigned content comprises downloadable content including one or more of musical content, videos, images, 3D models, software, e-books, games, virtual content, promotions and special offers.

3. The system of claim 1, wherein said user device is configured for augmented reality experiences, and said assigned content includes virtual objects and augmented reality content.

4. The system of claim 1, wherein said recognized article is one of a wearable item and an accessory.

5. The system of claim 1, wherein said recognized article incorporates one or more augmented reality anchors to facilitate said identifying.

6. The system of claim 1, wherein said verifying is based on a digital token.

7. A method comprising the steps of:
   (a) estimating a pose of a user device equipped with a camera;
   (b) recognizing an article to obtain a recognized article;
   (c) estimating a pose of said recognized article;
   (d) validating a spatial relationship between said recognized article and a user holding said user device based on said pose of said user device and said pose of said recognized article, wherein said pose of said user device and said pose of said recognized article consist of up to six degrees of freedoms of said user device and said recognized article respectively;
   (e) validating an association of said user with said article; and
   (f) presenting an assigned content of said article to said user upon verifying access rights of said user to said assigned content.

8. The method of claim 7, wherein said assigned content comprises downloadable content including one or more musical content, videos, images, 3D models, software, e-books, games, virtual content, promotions and special offers.

9. The method of claim 7, wherein said user device supports augmented reality features, and said assigned content includes augmented reality content and virtual objects.

10. The method of claim 7, wherein said recognized article is one of a wearable item and an accessory.

11. The method of claim 7, wherein said recognized article contains one or more augmented reality anchors to facilitate said recognizing.

12. The method of claim 7, wherein said verifying is based on a digital token.

13. The method of claim 7, executed at one of a retail store and an event venue.

14. The method of claim 7, wherein said validating is further based on a proximity of said article to said camera.

15. A system for presenting to a user, assigned content associated with an article, said system comprising:
   (a) a user device held by said user and equipped with a camera;
   (b) a module for estimating a pose of said user device;
   (c) an image recognition module for identifying said article and for estimating a pose of said article;
   (d) a spatial computation module for validating a spatial relationship between said recognized article and said user based on said pose of said user device and said pose of said article, wherein said pose of said user device and said pose of said article consist of up to six degrees of freedoms of said user device and said article respectively;

(e) a module for verifying access rights of said user to said assigned content; and (f) a module for said presenting based on said validating and said verifying.

16. The system of claim 15, wherein said assigned content includes one or more of multimedia, interactive elements, music, videos, images, 3D models, software, e-books, games, virtual content, promotions and special offers.

17. The system of claim 15, wherein said user device is configured for augmented reality experiences.

18. The system of claim 15, wherein said recognized article is a wearable item.

19. The system of claim 15, wherein said recognized article incorporates augmented reality anchors.

20. The system of claim 15, wherein said user is at a location selected from the group consisting of a store, a museum and an event venue.

21. The system of claim 15, wherein said validating is further based on estimating a proximity of said article to said camera.

22. The system of claim 15, wherein said verifying is based on a digital token.

23. A method comprising the steps of:

(a) estimating a pose of a user device equipped with a camera;

(b) identifying an article to obtain a recognized article;

(c) estimating a pose of said article;

(d) validating a spatial relationship between said recognized article and said user holding said user device, said validating based on said pose of said user device and said pose of said article, wherein said pose of said user and said pose of said recognized article consist of up to six degrees of freedoms of said user and said recognized article respectively;

(e) verifying access rights of said user to assigned content associated with said article; and (f) presenting on said user device said assigned content based on said validating and said verifying.

24. The method of claim 23, wherein said assigned content includes one or more of multimedia content, interactive elements, music, videos, images, 3D models, software, e-books, games, virtual content, promotions and special offers.

25. The method of claim 23, wherein said user device supports augmented reality features.

26. The method of claim 23, wherein said recognized article is a physical and wearable item.

27. The method of claim 23, wherein said recognized article contains one or more augmented reality anchors to facilitate said identifying.

28. The method of claim 23, wherein said verifying is based on a digital token.

29. The method of claim 23, executed at one of a retail outlet and an event venue.

* * * * *